(12) United States Patent
Abotabl et al.

(10) Patent No.: US 11,711,819 B2
(45) Date of Patent: Jul. 25, 2023

(54) UPLINK POWER CONTROL FOR FULL DUPLEX COMMUNICATION

(71) Applicant: QUALCOMM Incorporated, San Diego, CA (US)

(72) Inventors: Ahmed Attia Abotabl, San Diego, CA (US); Huilin Xu, Temecula, CA (US); Muhammad Sayed Khairy Abdelghaffar, San Jose, CA (US); Shimman Arvind Patel, San Diego, CA (US); Wanshi Chen, San Diego, CA (US); Hwan Joon Kwon, San Diego, CA (US); Krishna Kiran Mukkavilli, San Diego, CA (US); Tingfang Ji, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/303,891

(22) Filed: Jun. 9, 2021

(65) Prior Publication Data

US 2021/0392674 A1 Dec. 16, 2021

Related U.S. Application Data

(60) Provisional application No. 63/050,087, filed on Jul. 9, 2020, provisional application No. 63/037,538, filed on Jun. 10, 2020.

(51) Int. Cl.
*H04L 5/14* (2006.01)
*H04W 72/23* (2023.01)
(Continued)

(52) U.S. Cl.
CPC .......... *H04W 72/23* (2023.01); *H04L 1/0003* (2013.01); *H04L 5/14* (2013.01); *H04W 52/146* (2013.01);
(Continued)

(58) Field of Classification Search
CPC .......... H04L 12/28; H04L 12/50; H04L 5/14; H04W 72/23
(Continued)

(56) References Cited

U.S. PATENT DOCUMENTS

2012/0075989 A1  3/2012 Roessel et al.
2018/0146433 A1  5/2018 Zhang et al.
(Continued)

OTHER PUBLICATIONS

International Search Report and Written Opinion—PCT/US2021/070691—ISA/EPO—dated Oct. 4, 2021.

*Primary Examiner* — Dang T Ton
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive downlink control information (DCI) that schedules an uplink communication in an uplink frequency band. The UE may transmit, at an uplink frequency within the uplink frequency band, the uplink communication with a power that varies over the uplink frequency band based at least in part on a location of the uplink frequency relative to a downlink frequency band associated with the UE. Numerous other aspects are provided.

30 Claims, 12 Drawing Sheets

(51) Int. Cl.
     *H04W 72/0453*     (2023.01)
     *H04L 1/00*     (2006.01)
     *H04W 52/14*     (2009.01)
     *H04W 52/36*     (2009.01)

(52) U.S. Cl.
     CPC ..... *H04W 52/367* (2013.01); *H04W 72/0453* (2013.01)

(58) Field of Classification Search
     USPC ........................................ 370/329, 400, 395
     See application file for complete search history.

(56) References Cited

U.S. PATENT DOCUMENTS

| | | |
|---|---|---|
| 2018/0227912 A1 | 8/2018 | Chen et al. |
| 2018/0287673 A1 | 10/2018 | Chang et al. |
| 2022/0225245 A1* | 7/2022 | Khoshnevisan .... H04W 52/325 |

* cited by examiner

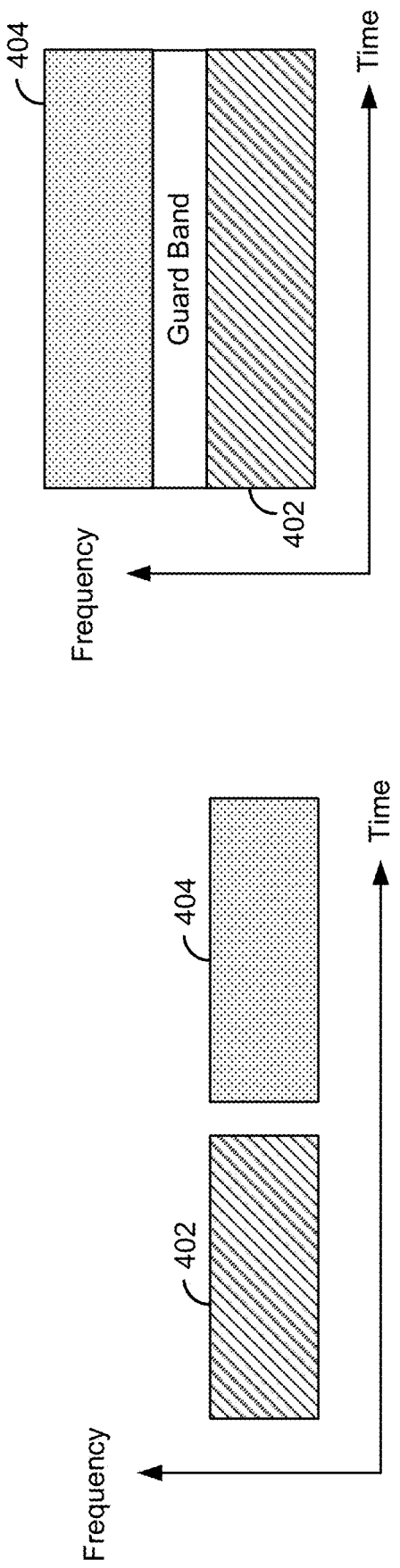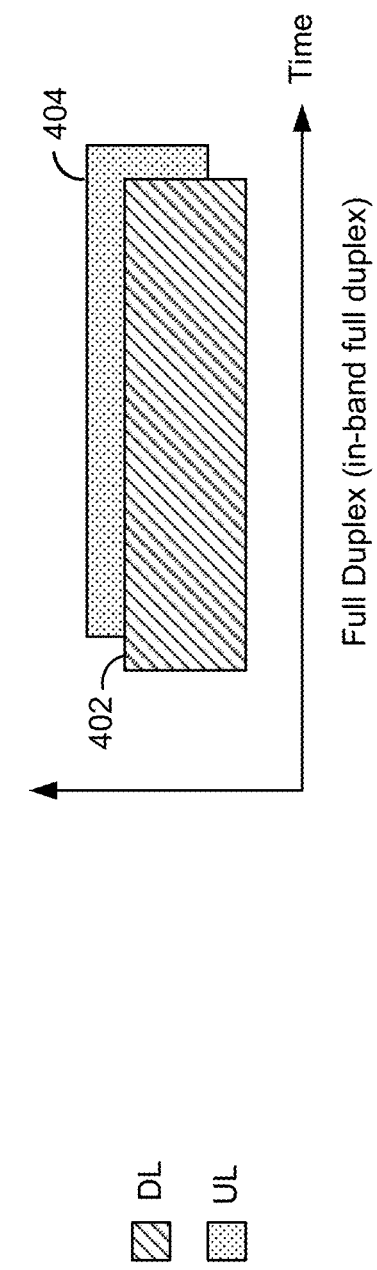
FIG. 4A
FIG. 4B
FIG. 4C

UPLINK POWER CONTROL FOR FULL DUPLEX COMMUNICATION

CROSS-REFERENCE TO RELATED APPLICATION

This Patent Application claims priority to U.S. Provisional Patent Application No. 63/037,538, filed on Jun. 10, 2020, entitled "UPLINK POWER CONTROL FOR FULL DUPLEX COMMUNICATION," and assigned to the assignee hereof, and to U.S. Provisional Patent Application No. 63/050,087, filed on Jul. 9, 2020, entitled "CONSIDERATIONS ON SUB-BAND UPLINK POWER CONTROL FOR FULL DUPLEX OPERATION," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for uplink power control for full duplex communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving downlink control information (DCI) that schedules an uplink communication in an uplink frequency band; and transmitting, at an uplink frequency within the uplink frequency band, the uplink communication with a power that varies over the uplink frequency band based at least in part on a location of the uplink frequency relative to a downlink frequency band associated with the UE.

In some aspects, a method of wireless communication, performed by a base station, may include transmitting, to a UE, DCI that schedules an uplink communication in an uplink frequency band; and receiving, from the UE, the uplink communication at an uplink frequency within the uplink frequency band with a power that varies over the uplink frequency band based at least in part on a location of the uplink frequency relative to a downlink frequency band associated with the UE.

In some aspects, a UE for wireless communication may include a memory and one or more processors coupled to the memory. The memory and the one or more processors may be configured to receive DCI that schedules an uplink communication in an uplink frequency band; and transmit, at an uplink frequency within the uplink frequency band, the uplink communication with a power that varies over the uplink frequency band based at least in part on a location of the uplink frequency relative to a downlink frequency band associated with the UE.

In some aspects, a base station for wireless communication may include a memory and one or more processors coupled to the memory. The memory and the one or more processors may be configured to transmit, to a UE, DCI that schedules an uplink communication in an uplink frequency band; and receive, from the UE, the uplink communication at an uplink frequency within the uplink frequency band with a power that varies over the uplink frequency band based at least in part on a location of the uplink frequency relative to a downlink frequency band associated with the UE.

In some aspects, a non-transitory computer-readable medium may store one or more instructions for wireless communication. The one or more instructions, when executed by one or more processors of a UE, may cause the one or more processors to receive DCI that schedules an uplink communication in an uplink frequency band; and transmit, at an uplink frequency within the uplink frequency band, the uplink communication with a power that varies over the uplink frequency band based at least in part on a location of the uplink frequency relative to a downlink frequency band associated with the UE.

In some aspects, a non-transitory computer-readable medium may store one or more instructions for wireless communication. The one or more instructions, when executed by one or more processors of a base station, may cause the one or more processors to transmit, to a UE, DCI that schedules an uplink communication in an uplink frequency band; and receive, from the UE, the uplink communication at an uplink frequency within the uplink frequency band with a power that varies over the uplink frequency band based at least in part on a location of the uplink frequency relative to a downlink frequency band associated with the UE.

In some aspects, an apparatus for wireless communication may include means for receiving DCI that schedules an uplink communication in an uplink frequency band; and means for transmitting, at an uplink frequency within the uplink frequency band, the uplink communication with a power that varies over the uplink frequency band based at least in part on a location of the uplink frequency relative to a downlink frequency band associated with the apparatus.

In some aspects, an apparatus for wireless communication may include means for transmitting, to a UE, DCI that schedules an uplink communication in an uplink frequency band; and means for receiving, from the UE, the uplink communication at an uplink frequency within the uplink frequency band with a power that varies over the uplink frequency band based at least in part on a location of the uplink frequency relative to a downlink frequency band associated with the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4C are diagrams illustrating various duplexing modes in a radio access network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
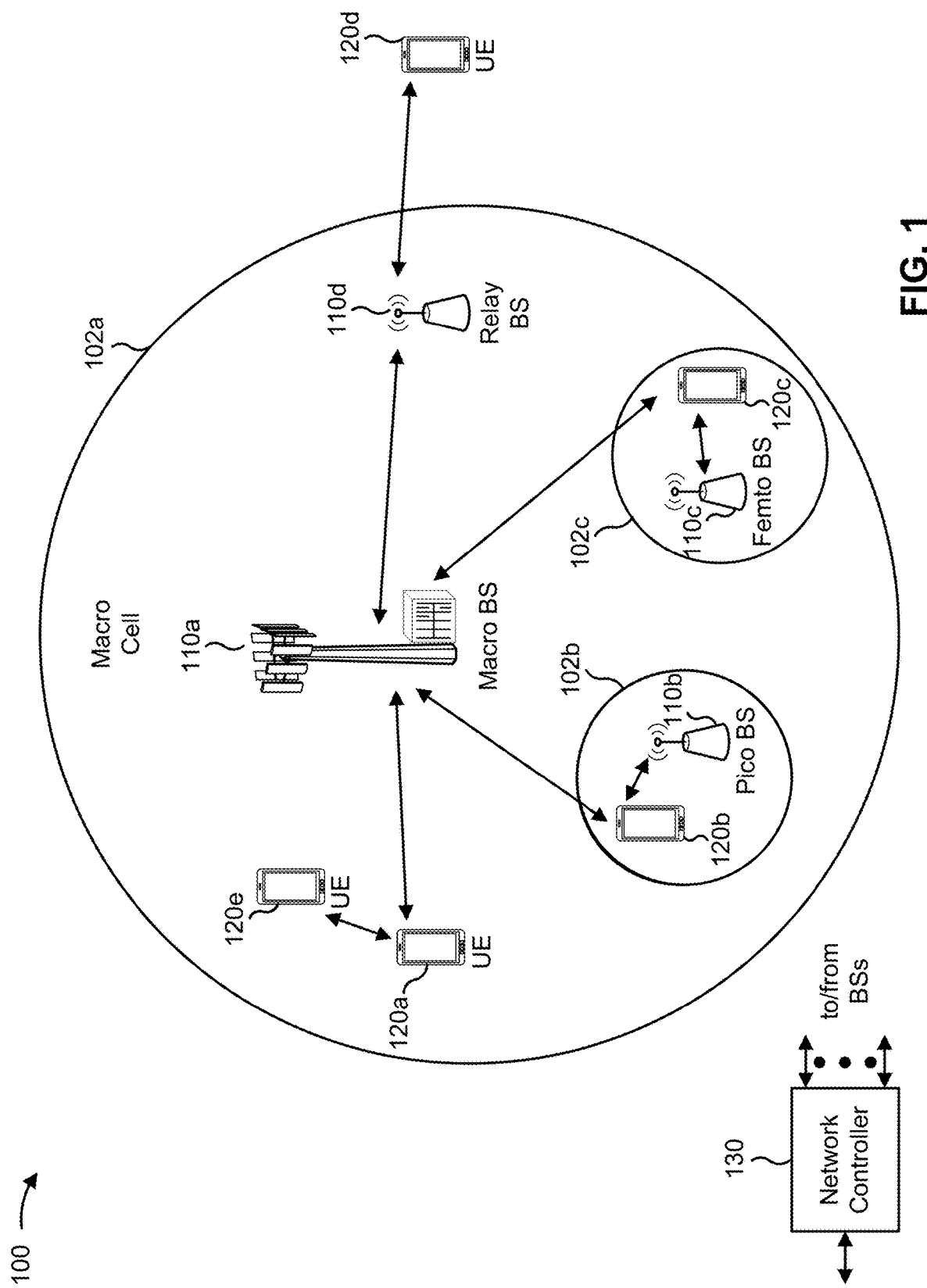
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
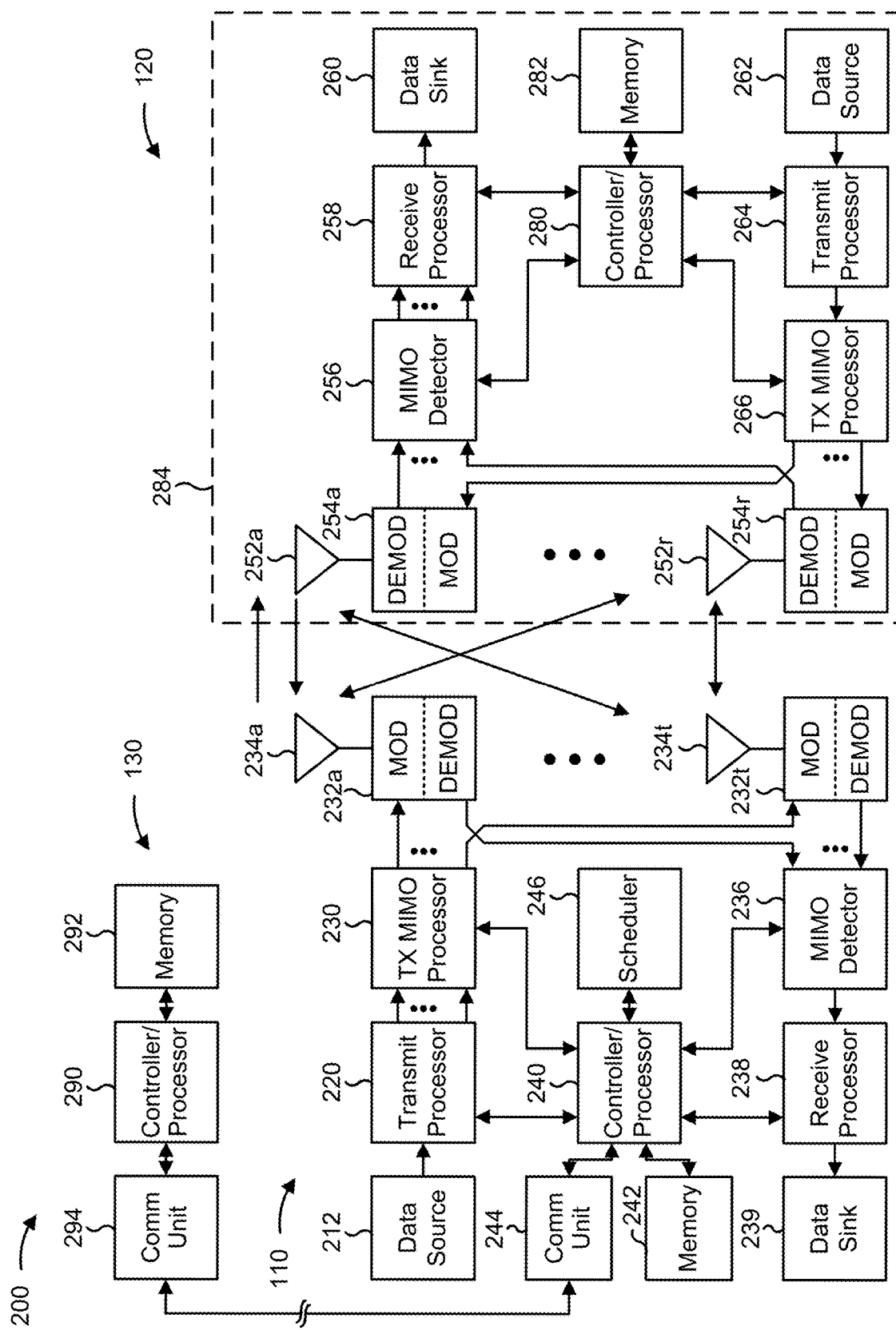
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6A, 6B, and 7-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6A, 6B, and 7-11).

Controller/processor 240 of base station 110, controller/processor 280 of UE 120, and/or any other component(s) of FIG. 2 may perform one or more techniques associated with uplink power control for full duplex communication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, UE 120 may include means for receiving (e.g., using antenna 252, DEMOD 254, MIMO detector 256, receive processor 258, controller/processor 280, memory 282, and/or the like) DCI that schedules an uplink communication in an uplink frequency band, means for transmitting (e.g., using controller/processor 280, transmit processor 264, TX MIMO processor 266, MOD 254, antenna 252, memory 282, and/or the like), at an uplink frequency within the uplink frequency band, the uplink communication with a power that varies over the uplink frequency band based at least in part on a location of the uplink frequency relative to a downlink frequency band associated with the UE 120, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting (e.g., using controller/processor 240, transmit processor 220, TX MIMO processor 230, MOD 232, antenna 234, memory 242, and/or the like), to a UE, DCI that schedules an uplink communication in an uplink frequency band, means for receiving (e.g., using antenna 234, DEMOD 232, MIMO detector 236, receive processor 238, controller/processor 240, memory 242, and/or the like), from the UE, the uplink communication at an uplink frequency within the uplink frequency band with a power that varies over the uplink frequency band based at least in part on a location of the uplink frequency relative to a downlink frequency band associated with the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3B:
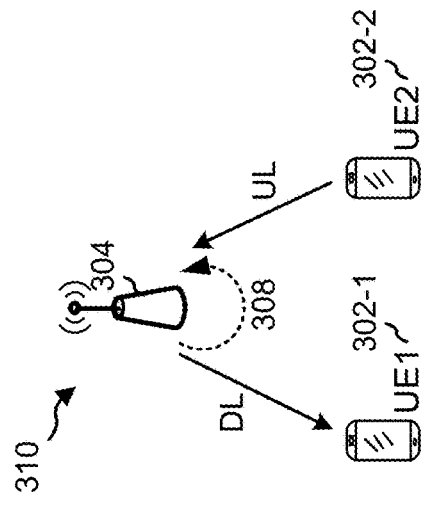
FIGS. 3A-3C are diagrams illustrating examples of full duplex communication, in accordance with the present disclosure.
Figure 3C:
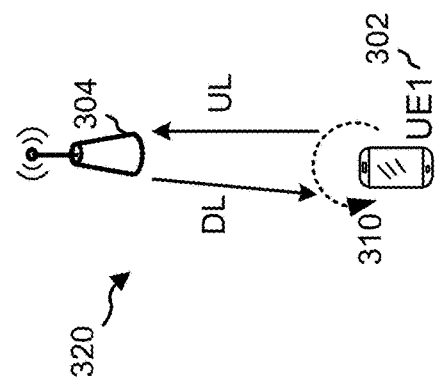
Figure 3A:
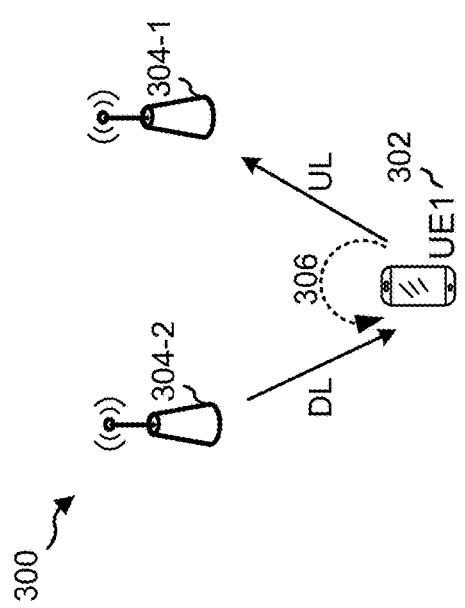

FIGS. 3A-3C are diagrams illustrating examples 300, 310, 320 of full duplex (FD) communication, in accordance with the present disclosure. FD communication may include a contemporaneous uplink and downlink communication. For example, the uplink and downlink communication may at least partially overlap in time.

The example 300 of FIG. 3A includes a UE1 302 and two base stations (e.g., TRPs) 304-1, 304-2, where the UE1 302 is sending a UL transmission to base station 304-1 and is receiving a DL transmission from base station 304-2. In the example 300 of FIG. 3A, FD is enabled for the UE1 302, and FD is not enabled for base stations 304-1, 304-2 (e.g., half duplex (HD) communication is enabled for base stations 304-1, 304-2). Moreover, as shown by reference number 306, the UL transmission to base station 304-1 may self-interfere with the DL transmission from base station 304-2. This may be caused by a variety of factors, such as the transmit power used for the UL transmission (as compared to the DL transmission), radio frequency bleeding, and/or the like.

The example 310 of FIG. 3B includes two UEs, UE1 302-1 and UE2 302-2, and a base station 304, where the UE1 302-1 is receiving a DL transmission from the base station 304 and the UE2 302-2 is transmitting a UL transmission to the base station 304. In the example 310 of FIG. 3B, FD is enabled for the base station 304, and FD is not enabled for UE1 302-1 and UE2 302-2 (e.g., HD communication is enabled for UE1 302-1 and UE2 302-2). Moreover, as shown by reference number 308, the DL transmission from base station 304 to UE1 302-1 may self-interfere with the UL transmission from UE2 302-2 to base station 304.

The example 320 of FIG. 3C includes a UE1 302 and a base station 304, where the UE1 302 is receiving a DL transmission from the base station 304 and the UE1 302 is transmitting a UL transmission to the base station 304. In the example 320 of FIG. 3C, FD is enabled for both the UE1 302 and the base station 304. Moreover, as shown by reference number 310, the UL transmission to base station 304 may self-interfere with the DL transmission from base station 304.

As indicated above, FIGS. 3A-3C are provided as one or more examples. Other examples may differ from what is described with regard to FIGS. 3A-3C.

FIGS. 4A-4C are diagrams illustrating various duplexing modes in a radio access network, in accordance with the present disclosure. FIG. 4A depicts a time division duplexing (TDD) mode of communication between a UE and a base station. In TDD, only one endpoint (e.g., one of a UE or a base station) may send information to another end point (e.g., the other of the UE or the base station) at a time. For example, in TDD, transmissions in different directions on a given channel are separated from one another using time division multiplexing. That is, at some times the channel is dedicated for transmissions in one direction, while at other times the channel is dedicated for transmissions in the other direction. In some cases, the direction may change rapidly, such as several times per slot. Thus, as illustrated in FIG. 4A, DL communications 402 are separated from UL communications 404 in time.

FIG. 4B depicts a frequency division duplexing (FDD) mode of communication between a UE and a base station. In FDD, both endpoints may simultaneously communicate with one another on different frequencies (e.g., different frequency bands, sets of sub-carriers, resource blocks, and/or the like). In the FDD mode, as shown in FIG. 4B, transmissions in different directions operate at different carrier frequencies. Thus, as illustrated in FIG. 4B, DL communications 402 are separated from UL communications 404 in frequency, shown as a guard band. In some cases, FDD may be referred to as full duplex because a wireless communication device may be capable of transmitting and receiving at the same time, where transmission uses a first frequency and reception uses a second frequency. Because simultaneous transmission and reception by a device in FDD use different frequencies, this full duplex mode may be referred to as sub-band FDD (or flexible duplex).

FIG. 4C depicts a true FD mode of communication between a UE and a base station. In the true FD mode, as shown in FIG. 4C, transmissions in different directions operate at the same carrier frequency or within overlapping bandwidths. In the example shown in FIG. 4C, DL communications 402 overlap (e.g., partially or fully) UL communications 404 in both time and frequency. Thus, when operating in a true FD mode, the UE and base station are configured for concurrent transmission and reception within an overlapping bandwidth. That is, simultaneous transmission and reception by a device in this mode can use the same frequency. As a result, this FD mode may be referred to as in-band FD.

As indicated above, FIGS. 4A-4C are provided as an example. Other examples may differ from what is described with respect to FIGS. 4A-4C.

Figure 5:
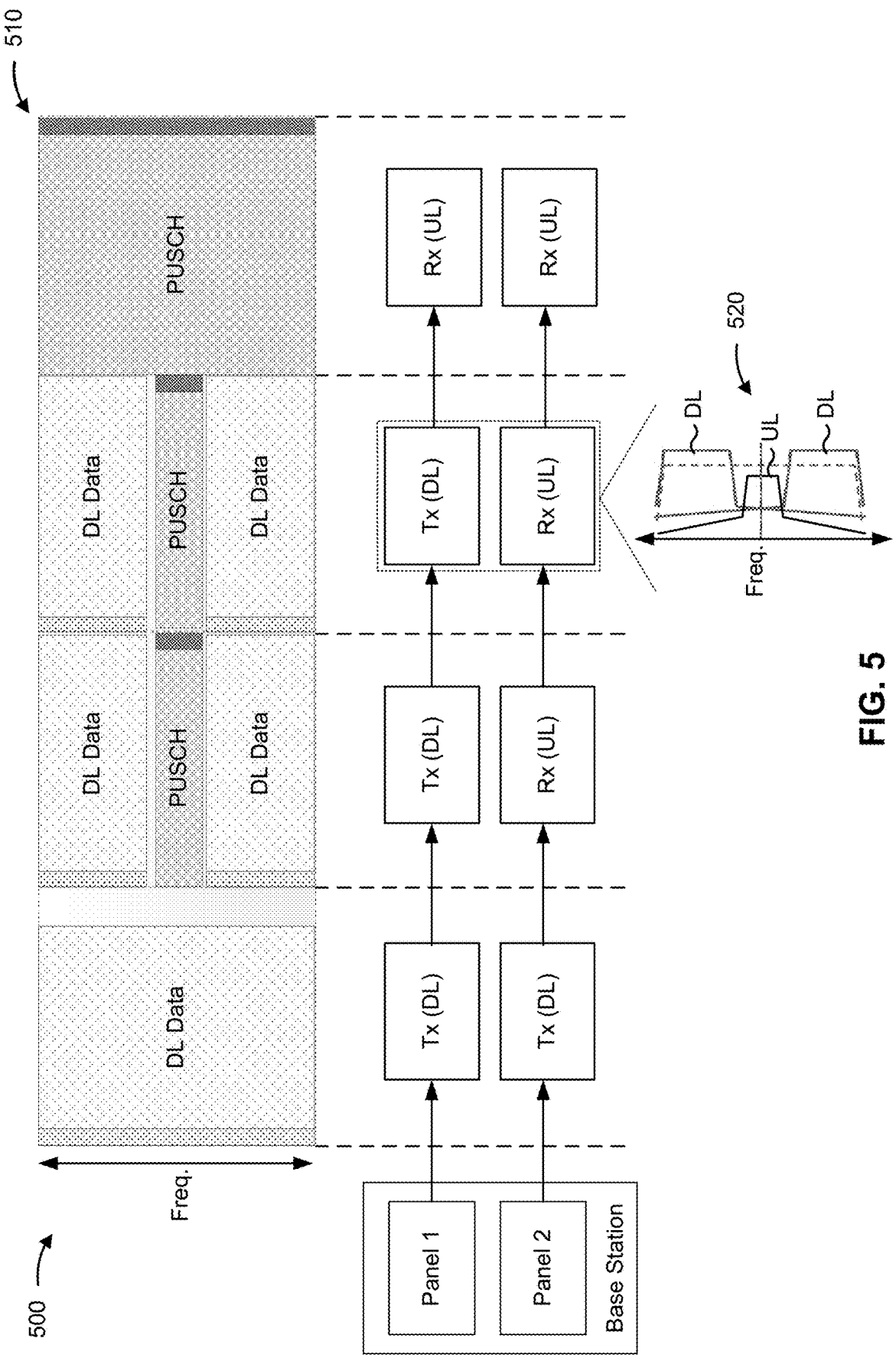
FIG. 5 is a diagram illustrating examples of a frequency division duplexing configuration, in accordance with the present disclosure.

FIG. 5 is a diagram illustrating examples of an FDD configuration, in accordance with the present disclosure. FIG. 5 shows examples of time intervals 510 (e.g., slots, slot groups, subframes, sub-slots, mini-slots, and/or the like). A time interval may include an uplink frequency region, a downlink frequency region, or both an uplink frequency region and a downlink frequency region. Each time interval may be associated with a control region, which is illustrated as a darker-shaded portion of the time interval, and/or a data region, which is shown as DL Data for a downlink frequency region or physical uplink shared channel (PUSCH) for an uplink frequency region. Uplink frequency regions are illustrated using a tighter dotted fill than downlink frequency regions.

An FDD configuration may indicate one or more downlink frequency regions and one or more uplink frequency regions. For example, an FDD configuration may divide an unpaired band (e.g., one or more component carriers of an unpaired band) into uplink frequency regions, downlink frequency regions, and/or other regions (e.g., guard bands and/or the like). An uplink frequency region and a downlink frequency region may or may not be equal in bandwidth. In some aspects, the FDD configuration may identify bandwidth part (BWP) configurations corresponding to the uplink frequency regions and downlink frequency regions. For example, a respective BWP may be configured for each uplink frequency region and each downlink frequency region. FDD may increase throughput and improve spectral efficiency, and may enable the usage of always-on uplink (e.g., for ultra reliable low latency communication (URLLC) control channels).

As further shown in FIG. 5, a base station (or a UE) may include multiple antenna panels (e.g., groups of antenna ports), shown as Panel 1 and Panel 2. The multiple antenna panels may enable simultaneous transmit (Tx) and receive (Rx) operations. Moreover, the multiple antenna panels may provide improved isolation for the simultaneous transmit and receive operations.

In some cases, as shown in FIG. 5, the base station (or a UE) may switch, on a slot-to-slot basis, between FD mode and HD mode. As an example, in an HD downlink time interval (e.g., slot), the base station may transmit a downlink transmission using Panel 1 and Panel 2. In an FD time interval, the base station may transmit a downlink transmission using Panel 1 and receive an uplink transmission using Panel 2. In an HD uplink time interval, the base station may receive an uplink transmission using Panel 1 and Panel 2.

As shown by reference number 520, in an FD mode, downlink communication (e.g., on Panel 1) may use the edges of a frequency band, and uplink communication (e.g., on Panel 2) may use a middle region of the frequency band (e.g., between the edges). However, as shown, frequency bleeding of uplink communication may cause interference with downlink communication (which may be a problem for a UE), and frequency bleeding of downlink communication may cause interference with uplink communication (which may be a problem for a base station).

A base station (or a UE) may perform various techniques for nullifying or cancelling self-interference, such as antenna isolation (using physically separated antennas for transmission or reception, as described above), analog interference cancellation, digital interference cancellation, massive MIMO (M-MIMO) based beamforming nulling for clutter reflection, and sub-band FD to achieve isolation based at least in part on an adjacent channel leakage ratio (ACLR), and/or the like. In sub-band FD, the downlink and the uplink are in different portions of a band or component carrier, as described above. A guard band (GB) may be provided between the uplink and the downlink. Receive weighted overlap and add (WOLA) operations may reduce ACLR leakage to the uplink signal. Analog low pass filters may improve analog-digital converter (ADC) dynamic range.

As indicated above, FIG. 5 is provided as an example. Other examples may differ from what is provided with regard to FIG. 5.

As described above, self-interference occurs when a signal is transmitted and another signal is received in overlapping time resources (e.g., FD resources). In some cases, reducing a transmit power may reduce the strength of the self-interference. For example, a base station may reduce downlink transmit power (e.g., perform downlink power control) to reduce self-interference, and a UE may reduce uplink transmit power (e.g., perform uplink power control) to reduce self-interference. A UE may perform uplink power control for uplink communications, such as PUSCH communications, physical uplink control channel (PUCCH) communications, sounding reference signals (SRSs), or random access channel (RACH) communications. For example, a UE may use Equation 1 for PUSCH power control (in accordance with 3GPP Technical Specification (TS) 38.213):

$$P_{PUSCH}(j,q,l) = \min\{P_{CMAX}, P_{O\_PUSCH}(j) + 10 \cdot \log_{10}(2^\mu + M_{RB}^{PUSCH}) + \alpha(j) \cdot PL(q) + \Delta_{TF} + f(l)\} \quad \text{Equation 1}$$

where $P_{O\_PUSCH}(j)$ is the target power, $\alpha(j)$ is the pathloss scaling factor, and $\Delta_{TF}$ accounts for MCS and code rate for uplink transmission.

In current wireless networks, uplink power control (e.g., used to reduce self-interference) reduces uplink transmit power over an entire uplink frequency band used for an uplink transmission. That is, a single uplink transmit power is used over the entire uplink frequency band for the uplink transmission. However, reducing the uplink transmit power over the entire uplink frequency band may impair a performance of the uplink transmission by weakening the strength of the uplink transmission.

Some techniques and apparatuses described herein provide improved uplink power control for uplink transmissions associated with FD communication. In some aspects, a UE may transmit an uplink communication with a power that varies over an uplink frequency band. For example, the power may vary based at least in part on a location of an uplink frequency within the uplink frequency band relative to a downlink frequency band used for FD communication. As an example, the UE may transmit the uplink communication using less power in sub-bands of the uplink frequency band that are nearer to the downlink frequency band, and using more power in sub-bands of the uplink frequency band that are further from the downlink frequency band. In this way, a signal strength of the uplink communication may be improved (e.g., relative to using a single transmit power for the uplink communication), thereby improving a performance of the uplink communication. Moreover, self-interference with a downlink communication in the downlink frequency band may be reduced, thereby improving a performance of the downlink communication.

Figure 6A:
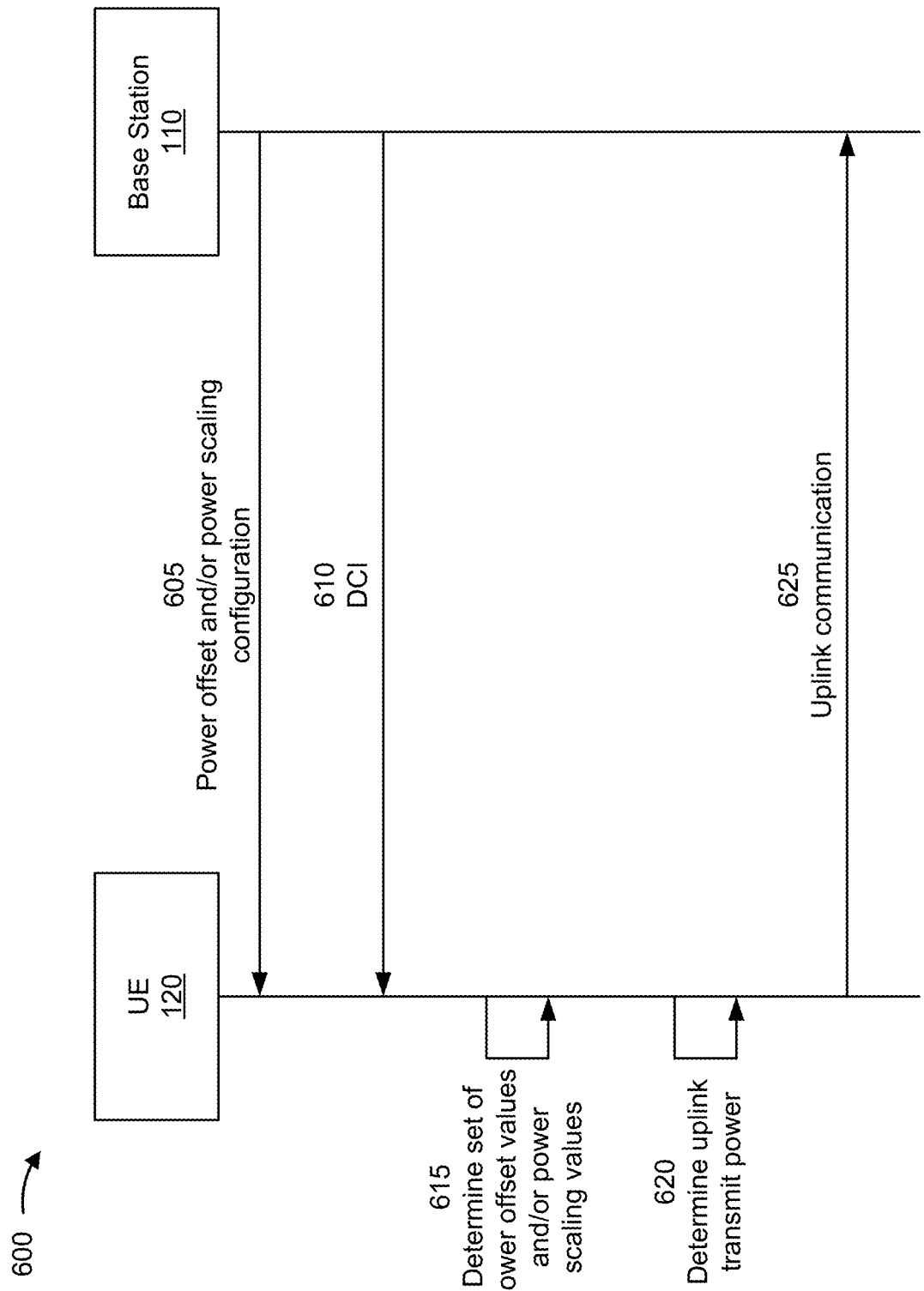
FIGS. 6A, 6B, and 7 are diagrams illustrating examples associated with uplink power control for full duplex communication, in accordance with the present disclosure.

FIG. 6A is a diagram illustrating an example 600 associated with uplink power control for FD communication, in accordance with the present disclosure. As shown in FIG. 6A, example 600 includes a base station 110 and a UE 120. In some aspects, the UE 120 may operate in an FD communication mode (e.g., the UE 120 may be an FD UE). For example, the UE 120 may concurrently transmit an uplink communication to the base station 110 and receive a downlink communication from the base station 110. As another example, the UE 120 may concurrently transmit an uplink communication to the base station 110 (e.g., a first TRP) and receive a downlink communication from another base station 110 (e.g., a second TRP).

As shown by reference number 605, the base station 110 may transmit (e.g., via radio resource control (RRC) signaling), and the UE 120 may receive, one or more power offset configurations and/or power scaling configurations. A power offset configuration may include information (e.g., a table, a mapping, and/or the like) that identifies one or more sets of power offset values for a plurality of sub-bands of an uplink frequency band (e.g., an uplink frequency band of an FD resource, a component carrier, a bandwidth part, and/or the like). For example, a set of power offset values may include respective power offset values (e.g., 0, −2, +3, and/or the like) for the plurality of sub-bands. As an example, a first power offset value of the set may be associated with a first sub-band, a second power offset value of the set may be associated with a second sub-band, and so forth (e.g., each resource bandwidth is configured with a power offset). In some aspects, a power offset value for a sub-band may be negative infinity to prevent transmission on the sub-band (e.g., to puncture the transmission in the sub-band). Different sets of power offset values may indicate different combinations of power offset values, and thereby provide different variations for an uplink transmit power across the uplink frequency band.

In some aspects, a power offset configuration, or another configuration (e.g., another RRC configuration), may configure the plurality of sub-bands. For example, each sub-band, of the plurality of sub-bands, may be configured to be a particular size (e.g., a quantity of resource elements (REs), a quantity of resource blocks (RBs), a quantity of RB groups (RBGs), and/or the like), and the plurality of sub-bands may include sub-bands that are different sizes and/or include sub-bands that are the same size. Accordingly, each power offset value, of a set of power offset values, may be associated with a particular sub-band size. For example, a first power offset value may be associated with a first sub-band size (e.g., quantity of REs, RBs, RBGs, and/or the like), a second power offset value may be associated with a second sub-band size, and so forth. Different sets of power offset values may indicate different combinations of sub-band sizes, and thereby provide different variations for an uplink transmit power across the uplink frequency band.

A power scaling configuration may include information (e.g., a table, a mapping, and/or the like) that identifies one or more sets of power scaling values for a plurality of symbols (e.g., symbol indices). For example, a set of power scaling values may include respective power scaling values (e.g., 1, −0.1, +0.2, and/or the like) for the plurality of symbols. As an example, a first power scaling value of the set may be associated with a first symbol (e.g., symbol index), a second power scaling value of the set may be associated with a second symbol, and so forth. The plurality of symbols may be associated with a slot (e.g., 14 symbols), or another time interval. Different sets of power scaling values may indicate different combinations of power scaling values.

As shown by reference number 610, the base station 110 may transmit, and the UE 120 may receive, downlink control information (DCI). The DCI may indicate an uplink grant for the UE 120. For example, the DCI may schedule an uplink communication for the UE 120 at an uplink frequency within an uplink frequency band (e.g., an uplink frequency band of an FD resource). The DCI may schedule the uplink communication in resources that overlap in time with a downlink communication that is to be received by the UE 120 in one or more downlink frequency bands (e.g., one or more downlink frequency bands of the FD resource). That is, the UE 120 may be scheduled to transmit the uplink communication, and to receive the downlink communication in the same, or overlapping, time resources (e.g., in FD resources). In addition, the DCI may schedule the uplink communication in resources that overlap in frequency with the downlink communication (e.g., in-band FD), or in resources that do not overlap in frequency with the downlink communication (e.g., sub-band FDD).

In some aspects, the DCI may indicate a set of power offset values and/or a set of power scaling values that the UE 120 is to use for the uplink communication. That is, the DCI may activate a particular set of power offset values of the one or more sets of power offset values configured for the UE 120, and/or activate a particular set of power scaling values of the one or more sets of power scaling values configured for the UE 120. In some aspects, the base station 110 may indicate (e.g., activate) the set of power offset values and/or the set of power scaling values that the UE 120 is to use for the uplink communication via a medium access control (MAC) control element (MAC-CE) and/or RRC signaling. In some aspects, the base station 110 may determine the set of power offset values and/or the set of power scaling values that the UE 120 is to use for the uplink communication based at least in part on a location of the uplink frequency relative to the downlink frequency band(s), as described below.

As shown by reference number 615, the UE 120 may determine a set of power offset values and/or a set of power scaling values that the UE 120 is to use for the uplink communication. For example, the UE 120 may determine the set of power offset values and/or the set of power scaling values according to an indication (e.g., activation) provided by the base station 110 (e.g., in the DCI), as described above.

Additionally, or alternatively, the UE 120 may determine the set of power offset values and/or the set of power scaling values based at least in part on a location of the uplink frequency relative to the downlink frequency band(s). In some aspects, the UE 120 may determine the set of power offset values and/or the set of power scaling values based at least in part on the size of a frequency gap between the uplink frequency and the downlink frequency band(s). As an example, if the size of the frequency gap satisfies a first threshold value, the UE 120 may select a first set of power offset values (e.g., associated with a first power attenuation), and if the size of the frequency gap satisfies a second threshold value (or does not satisfy the first threshold value), the UE 120 may select a second set of power offset values (e.g., associated with a second power attenuation).

For example, if the size of the frequency gap satisfies a threshold value (e.g., the size of the frequency gap is larger than a configured guard band size), the UE 120 may select a set of power offset values that includes relatively small power offset values for sub-bands associated with the edge(s) of the uplink frequency band (e.g., the first and/or last power offset values of the set, the first two and/or last two power offset values of the set, and/or the like). As another example, if the size of a guard band (e.g., between the uplink frequency band and the downlink frequency band(s)) satisfies another threshold value (e.g., the size of the guard band is less than the other threshold value), the UE 120 may select a set of power offset values that includes relatively large power offset values for sub-bands associated with the edge(s) of the uplink frequency band. In some aspects, the uplink communication may not overlap in time with a downlink communication that is to be received by the UE 120. In this case, the UE 120 may select a set of power offset values that does not include a non-zero power offset value for a sub-band (e.g., the set of power offset values may be all zeroes). In addition to, or as an alternative to, the examples above, other rules may be used to determine the set of power offset values that is to be used for the uplink communication.

In this way, the set of power offset values is selected such that the sub-bands associated with the edge(s) of the uplink frequency band, and therefore nearest to the downlink frequency band(s), may be associated with relatively greater power attenuation (or a relatively smaller power increase) if the uplink frequency and the downlink frequency band(s) are nearer, and relatively smaller power attenuation (or a relatively greater power increase) if the uplink frequency and the downlink frequency band(s) are further. For example, the UE 120 may use a lower power for sub-bands that are nearer to the downlink frequency band, and use a higher power for sub-bands that are further from the downlink frequency band.

As shown by reference number 620, the UE 120 may determine an uplink transmit power for the uplink communication. In a case where the UE 120 is to use a set of power scaling values, the UE 120 may determine an uplink transmit power for the uplink communication according to Equation 1, described above. In this case, the UE 120 may apply the set of power scaling values to the determined uplink transmit power. For example, in a first symbol, the UE 120 may apply a first power scaling value of the set to the determined uplink transmit power, in a second symbol, the UE 120 may apply a second power scaling value of the set to the determined uplink transmit power, and so forth.

In a case where the UE 120 is to apply a set of power offset values, the UE 120 may determine respective uplink transmit powers for the plurality of sub-bands of the uplink frequency band based at least in part on the set of power offset values (e.g., by adding a power offset value for a sub-band to an uplink transmit power for the sub-band, or subtracting the power offset value from the uplink transmit power). For example, the UE 120 may determine respective uplink transmit powers for the plurality of sub-bands according to Equation 2:

$$P_{PUSCH}(j,q,l) = \min\{P_{CMAX}, P_{O\_PUSCH}(j) + 10 \cdot \log_{10}(2^{\mu} \cdot M_{RB}^{PUSCH}) + \alpha(j) \cdot PL(q) + \Delta_{TF} + f(l) + \text{subband power offset value}\}$$ Equation 2

The uplink transmit power that the UE 120 is to use for the uplink communication may be based at least in part on the respective uplink transmit powers determined for the plurality of sub-bands. That is, the uplink transmit power that the UE 120 is to use for the uplink communication may vary (e.g., fluctuate) across the uplink frequency band based at least in part on the respective uplink transmit powers determined for the plurality of sub-bands.

As shown by reference number 625, the UE 120 may transmit, and the base station 110 (or another base station 110) may receive, the uplink communication at an uplink frequency in the uplink frequency band. The UE 120 may transmit the uplink communication using the uplink transmit power determined by the UE 120. Accordingly, the uplink transmit power used by the UE 120 may vary over the uplink frequency band (e.g., because the uplink transmit power may be based at least in part on multiple sub-band uplink transmit powers according to a set of power offset values, where the uplink frequency is within or corresponds to one of the multiple sub-bands associated with one of the sub-band uplink transmit powers). Moreover, the UE 120 may receive the downlink communication (e.g., from the base station 110 or another base station 110) concurrently with transmitting the uplink communication. In this way, the UE 120 may use a greater transmit power for the uplink communication, and may reduce self-interference with the downlink communication, thereby improving a performance of the uplink communication and the downlink communication.

In some aspects, the UE 120 may transmit the uplink communication using different power control parameters, for example, using uplink power control parameters per sub-band, as described below in connection with FIG. 6B. Uplink power control parameters per sub-band provide more control and increased flexibility for reducing self-interference, while also protecting the uplink communication.

As indicated above, FIG. 6A is provided as an example. Other examples may differ from what is described with respect to FIG. 6A.

Figure 6B:
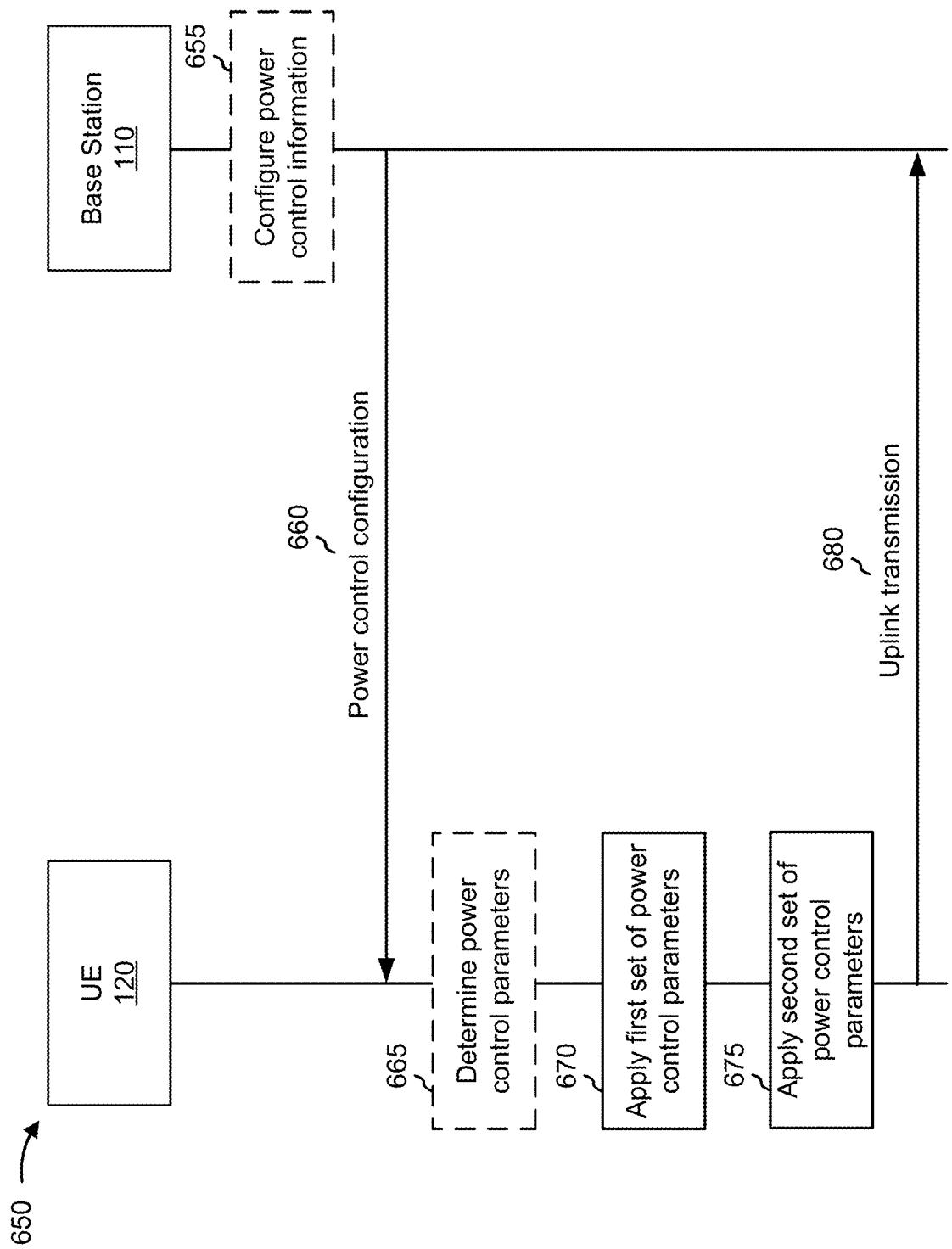

FIG. 6B is a diagram illustrating an example 650 associated with uplink power control for FD communication, in accordance with the present disclosure. As shown in FIG. 6B, example 650 includes a base station 110 and a UE 120, as described above in connection with FIG. 6A.

As illustrated at 655, the base station 110 may configure power control information for one or more sub-bands of an uplink transmission (e.g., the uplink communication described above in connection with FIG. 6A). The base station 110 may configure the power control information for the one or more sub-bands of the uplink transmission based at least in part on sub-band full-duplex communication. The base station 110 may transmit, e.g., as shown at 660, the power control information to a UE 120. The UE 120 may receive the power control information from the base station 110. In some aspects, the power control information includes at least one of a maximum power, a minimum power, a band separation with a downlink transmission, or a band corresponding to a half-duplex transmission.

In some aspects, the power control configuration may include at least one of sub-band information for power control or a power control parameter for at least one sub-band. In some aspects, the UE 120 may receive a configuration for one or more power control parameters for a first sub-band of at least one sub-band of the uplink transmission. The power control configuration for power control parameters for the uplink transmission is received from the base station 110 via RRC or DCI signaling. In some aspects, the one or more power control parameters for the first sub-band may include at least one of a maximum power, a minimum power, a band separation with a downlink transmission, or a band corresponding to a half-duplex transmission.

In some aspects, as illustrated at 665, the UE 120 may determine power control parameters. The UE 120 may determine the power control parameters for one or more additional sub-bands for the uplink transmission. The UE 120 may determine the power control parameters for one or more additional sub-bands for the uplink transmission based at least in part on at least two of a frequency allocation of the first sub-band, a bandwidth of the first sub-band, or a beam configuration of the UE 120.

At 670, the UE 120 may apply a first set of one or more power control parameters. The UE 120 may apply the first set of the one or more power control parameters for a first sub-band of the uplink transmission.

At 675, the UE 120 may apply a second set of one or more power control parameters. The UE 120 may apply the second set of one or more power control parameters for a second sub-band of the uplink transmission. In some aspects, the UE 120 may apply the first set of one or more power control parameters for the first sub-band and the second set of one or more power control parameters for the second sub-band during a full duplex symbol and a half duplex symbol. In some aspects, the first power control parameter and the second power control parameter include a target power, a pathloss scaling factor, an offset value, or a downlink MCS term. In some aspects, at least one of the first set of one or more power control parameters or the second set of one or more power control parameters is determined by the UE 120. For example, the network, via the base station 110, may signal the uplink power control parameters of one or more sub-bands, such that the UE 120 may derive the uplink power control parameters of each of the one or more sub-bands based at least in part on a frequency allocation of a sub-band and a corresponding bandwidth. In some aspects, at least one of the first set of one or more power control parameters or the second set of one or more power control parameters is received from a network. For example, the network, via the base station 110, may configure the UE 120 with the uplink power control parameters for each of the one or more sub-bands via RRC or a scheduling DCI.

At 680, the UE 120 may transmit the uplink transmission. The UE 120 may transmit the uplink transmission over at least the first sub-band based at least in part on the first set of one or more power control parameters and the second sub-band based at least in part on the second set of one or more power control parameters. In some aspects, at least one of first set of one or more power control parameters or the second set of one or more power control parameters may be defined for a SRS resource indicator (SRI) or for a URLLC or non-URLLC mode. The uplink transmission may include at least one of a PUSCH, a PUCCH, SRSs, or a RACH. At least one of the first set of one or more power control parameters or the second set of one or more power control parameters may be associated with at least one of the PUSCH, the PUCCH, the SRSs, or the RACH for a full duplex operation. In some aspects, a set of power control parameters may be configured for half duplex communication for at least one of the PUSCH, the PUCCH, the SRSs, or the RACH. In some aspects, the power control parameters may be configured for full duplex communication. In some aspects, for example uplink transmissions that span both full duplex and half duplex symbols, the UE 120 may apply the full duplex sub-band uplink power control in an effort to reduce or avoid phase discontinuity.

As indicated above, FIG. 6B is provided as an example. Other examples may differ from what is described with respect to FIG. 6B.

Figure 7:
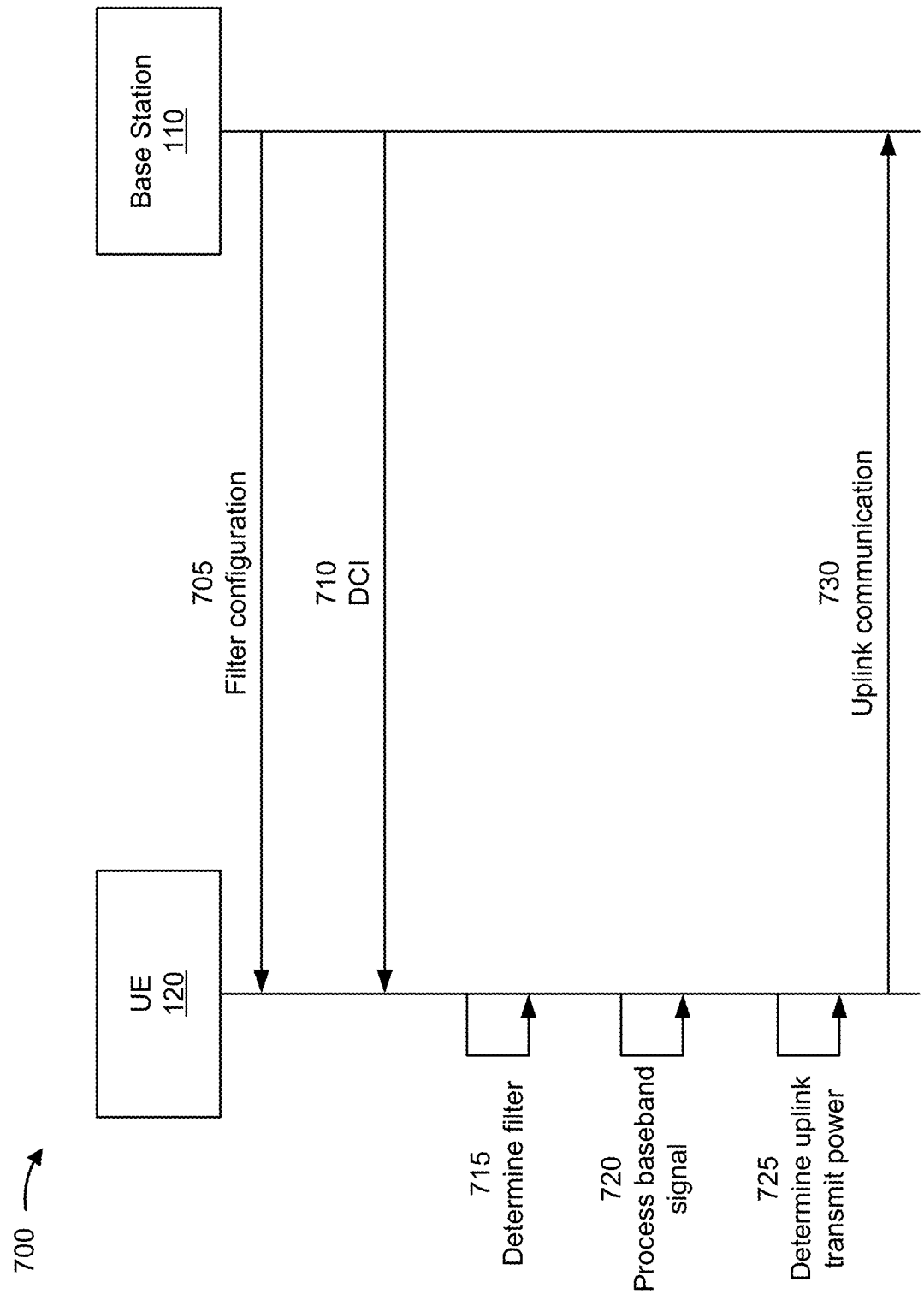

FIG. 7 is a diagram illustrating an example 700 associated with uplink power control for FD communication, in accordance with the present disclosure. As shown in FIG. 7, example 700 includes a base station 110 and a UE 120, as described above in connection with FIG. 6A.

As shown by reference number 705, the base station 110 may transmit (e.g., via RRC signaling), and the UE 120 may receive, one or more filter configurations. A filter configuration may include information (e.g., a table, a mapping, and/or the like) that identifies one or more filters for processing a baseband signal (e.g., a non-modulated signal). The one or more filters may be low-pass filters. For example, a filter may attenuate signals for frequencies (e.g., sub-bands) associated with the edge(s) of an uplink frequency band (e.g., a span of lowest frequencies of the uplink frequency band and/or a span of highest frequencies of the uplink frequency band, and/or the like). Different filters may provide different signal attenuations, and thereby provide different variations for an uplink transmit power across the uplink frequency band.

As shown by reference number 710, the base station 110 may transmit, and the UE 120 may receive, DCI. The DCI may indicate an uplink grant for the UE 120. For example, the DCI may schedule an uplink communication for the UE 120 at an uplink frequency within an uplink frequency band (e.g., an uplink frequency band of an FD resource). The DCI may schedule the uplink communication in resources that overlap in time with a downlink communication that is to be received by the UE 120 in one or more downlink frequency bands, as described above in connection with FIG. 6. In addition, the DCI may schedule the uplink communication in resources that overlap in frequency with the downlink communication, or in resources that do not overlap in frequency with the downlink communication, as described above in connection with FIG. 6.

In some aspects, the DCI may indicate a filter that the UE 120 is to use for processing a baseband signal associated with the uplink communication. That is, the DCI may activate a particular filter of the one or more filters configured for the UE 120. In some aspects, the base station 110 may indicate (e.g., activate) the filter that the UE 120 is to use for processing the baseband signal via a MAC-CE and/or RRC signaling. In some aspects, the base station 110 may determine the filter that the UE 120 is to use for processing the baseband signal based at least in part on a location of the uplink frequency relative to the downlink frequency band(s), as described below for the UE 120.

As shown by reference number 715, the UE 120 may determine a filter that the UE 120 is to use for processing the baseband signal associated with the uplink communication. For example, the UE 120 may determine the filter according to an indication (e.g., activation) provided by the base station 110 (e.g., in the DCI), as described above.

Additionally, or alternatively, the UE 120 may determine the filter based at least in part on a location of the uplink frequency relative to the downlink frequency band(s). In some aspects, the UE 120 may determine the filter based at least in part on the size of a frequency gap between the uplink frequency and the downlink frequency band(s). As an example, if the size of the frequency gap satisfies a first threshold value, the UE 120 may select a first filter (e.g., associated with a first power attenuation), and if the size of the frequency gap satisfies a second threshold value (or does not satisfy the first threshold value), the UE 120 may select a second filter (e.g., associated with a second power attenuation).

For example, if the size of the frequency gap satisfies a threshold value (e.g., the size of the frequency gap is larger than a configured guard band size), the UE 120 may select a filter that provides relatively small power attenuation at the edge(s) of the uplink frequency band (e.g., a span of lowest frequencies of the uplink frequency band and/or a span of highest frequencies of the uplink frequency band). As another example, if the size of a guard band (e.g., between the uplink frequency band and the downlink frequency band(s)) satisfies another threshold value (e.g., the size of the guard band is less than the other threshold value), the UE 120 may select a filter that provides relatively large power attenuation at the edge(s) of the uplink frequency band. In some aspects, the uplink communication may not overlap in time with a downlink communication that is to be received by the UE 120. In this case, the UE 120 may determine that a filter is not to be used to process the baseband signal. In addition to, or as an alternative to, the examples above, other rules may be used to determine the filter.

In this way, the filter is selected such that frequencies associated with the edge(s) of the uplink frequency band, and therefore nearest to the downlink frequency band(s), may be associated with relatively greater power attenuation (or a relatively smaller power increase) if the uplink frequency and the downlink frequency band(s) are nearer, and relatively smaller power attenuation (or a relatively greater power increase) if the uplink frequency and the downlink frequency band(s) are further. For example, the UE 120 may use a lower power for frequencies that are nearer to the downlink frequency band, and use a higher power for frequencies that are further from the downlink frequency band.

As shown by reference number 720, the UE 120 may process the baseband signal associated with the uplink communication using the determined filter. As shown by reference number 725, the UE 120 may determine an uplink transmit power for the uplink communication. For example, the UE 120 may determine an uplink transmit power for the uplink communication according to Equation 1, described above.

As shown by reference number 730, the UE 120 may transmit, and the base station 110 (or another base station 110) may receive, the uplink communication at an uplink frequency in the uplink frequency band. The UE 120 may transmit the uplink communication based at least in part on processing the baseband signal associated with the uplink communication using the filter. In addition, the UE 120 may transmit the uplink communication using the uplink transmit power determined by the UE 120. Accordingly, the uplink transmit power used by the UE 120 may vary over the uplink frequency band (e.g., due to processing of the baseband signal with the filter). Moreover, the UE 120 may receive the downlink communication (e.g., from the base station 110 or another base station 110) concurrently with transmitting the uplink communication. In this way, the UE 120 may use a greater transmit power for the uplink communication, and may reduce self-interference with the downlink communication, thereby improving a performance of the uplink communication and the downlink communication.

As indicated above, FIG. 7 is provided as an example. Other examples may differ from what is described with respect to FIG. 7.

Figure 8:
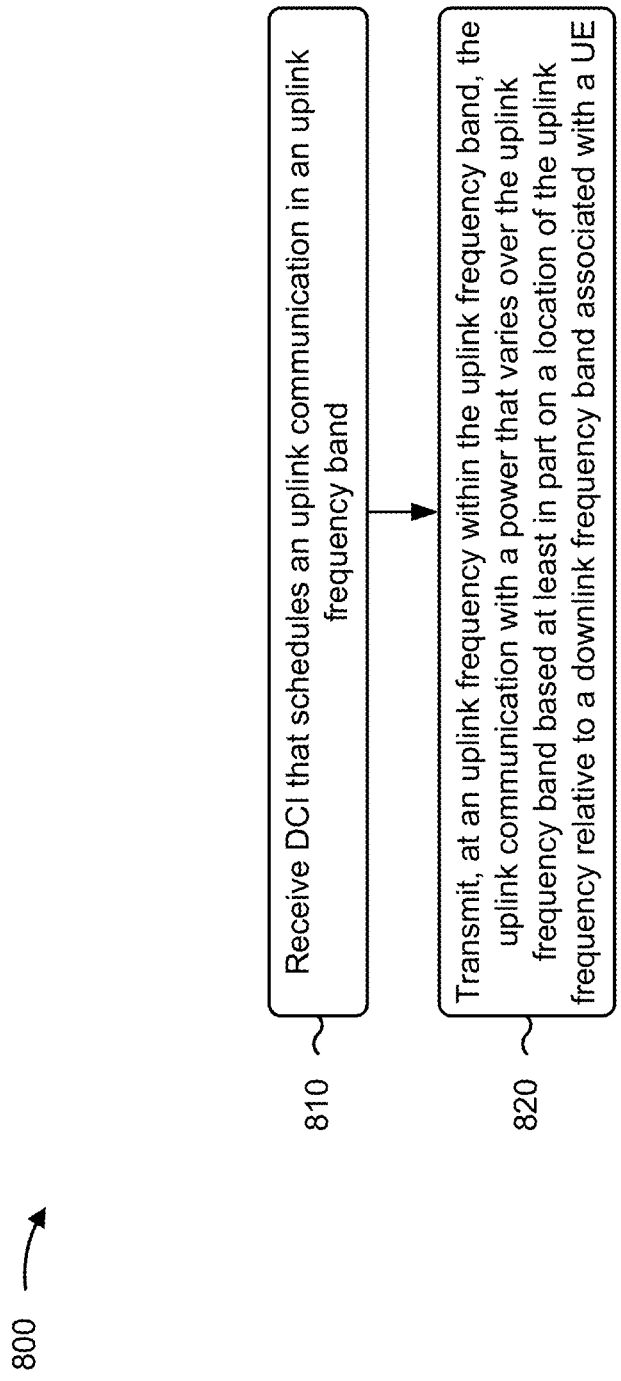
FIGS. 8-11 are diagrams illustrating example processes associated with uplink power control for full duplex communication, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with uplink power control for FD communication.

As shown in FIG. 8, in some aspects, process 800 may include receiving DCI that schedules an uplink communication in an uplink frequency band (block 810). For example, the UE (e.g., using antenna 252, DEMOD 254, MIMO detector 256, receive processor 258, controller/processor 280, and/or the like) may receive DCI that schedules an uplink communication in an uplink frequency band, as described above, for example, with reference to FIGS. 6A, 6B, and/or 7.

As further shown in FIG. 8, in some aspects, process 800 may include transmitting, at an uplink frequency within the uplink frequency band, the uplink communication with a power that varies over the uplink frequency band based at least in part on a location of the uplink frequency relative to a downlink frequency band associated with the UE (block 820). For example, the UE (e.g., using controller/processor 280, transmit processor 264, TX MIMO processor 266, MOD 254, antenna 252, and/or the like) may transmit, at an uplink frequency within the uplink frequency band, the uplink communication with a power that varies over the uplink frequency band based at least in part on a location of the uplink frequency relative to a downlink frequency band associated with the UE, as described above, for example, with reference to FIGS. 6A, 6B, and/or 7.

Process 800 may include additional aspects, such as any single aspect or any combination of aspects described below and/or in connection with one or more other processes described elsewhere herein.

In a first aspect, the power varies over the uplink frequency band based at least in part on a frequency gap between the uplink frequency and the downlink frequency band.

In a second aspect, alone or in combination with the first aspect, process 800 includes receiving a configuration for a plurality of sub-bands of the uplink frequency band.

In a third aspect, alone or in combination with one or more of the first and second aspects, a first sub-band and a second sub-band, of the plurality of sub-bands, are configured with different resource element sizes, different resource block sizes, or different resource block group sizes.

In a fourth aspect, alone or in combination with one or more of the first through third aspects, process 800 includes receiving information that identifies at least one of: one or more sets of power offsets for a plurality of sub-bands of the uplink frequency band, or one or more sets of power scaling values for a plurality of symbols in which the uplink communication is scheduled.

In a fifth aspect, alone or in combination with one or more of the first through fourth aspects, process 800 includes receiving an indication of a set of power offsets, of the one or more sets of power offsets, or a set of power scaling values, of the one or more sets of power scaling values, that is to be used for the uplink communication at the uplink frequency.

In a sixth aspect, alone or in combination with one or more of the first through fifth aspects, the indication is received via the DCI, a MAC-CE, or RRC signaling.

In a seventh aspect, alone or in combination with one or more of the first through sixth aspects, process 800 includes determining a set of power offsets, of the one or more sets of power offsets, or a set of power scaling values, of the one or more sets of power scaling values, that is to be used for the uplink communication at the uplink frequency.

In an eighth aspect, alone or in combination with one or more of the first through seventh aspects, the set of power offsets or the set of power scaling values is determined based at least in part on at least one of a frequency gap between the uplink frequency and the downlink frequency band, or whether a downlink communication in the downlink frequency band is scheduled to overlap in time with the uplink communication.

In a ninth aspect, alone or in combination with one or more of the first through eighth aspects, process 800 includes determining respective transmit powers for multiple sub-bands of the uplink frequency band based at least in part on a set of power offsets, where the power varies over the uplink frequency band based at least in part on the respective transmit powers.

In a tenth aspect, alone or in combination with one or more of the first through ninth aspects, the uplink communication is not transmitted at the uplink frequency in a sub-band, of the multiple sub-bands, associated with a power offset, of the set of power offsets, that has a negative infinity value.

In an eleventh aspect, alone or in combination with one or more of the first through tenth aspects, process 800 includes receiving information that identifies a plurality of filters for processing a baseband signal associated with the uplink communication.

In a twelfth aspect, alone or in combination with one or more of the first through eleventh aspects, process 800 includes receiving an indication of a filter, of the plurality of filters, that is to be used for processing the baseband signal.

In a thirteenth aspect, alone or in combination with one or more of the first through twelfth aspects, the indication is received via the DCI, a MAC-CE, or RRC signaling.

In a fourteenth aspect, alone or in combination with one or more of the first through thirteenth aspects, process 800 includes determining a filter, of the plurality of filters, that is to be used for processing the baseband signal.

In a fifteenth aspect, alone or in combination with one or more of the first through fourteenth aspects, the filter is determined based at least in part on at least one of a frequency gap between the uplink frequency and the downlink frequency band, or whether a downlink communication in the downlink frequency band is scheduled to overlap in time with the uplink communication.

In a sixteenth aspect, alone or in combination with one or more of the first through fifteenth aspects, process 800 includes processing a baseband signal associated with the uplink communication using a filter, where the power varies over the uplink frequency band based at least in part on processing the baseband signal using the filter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
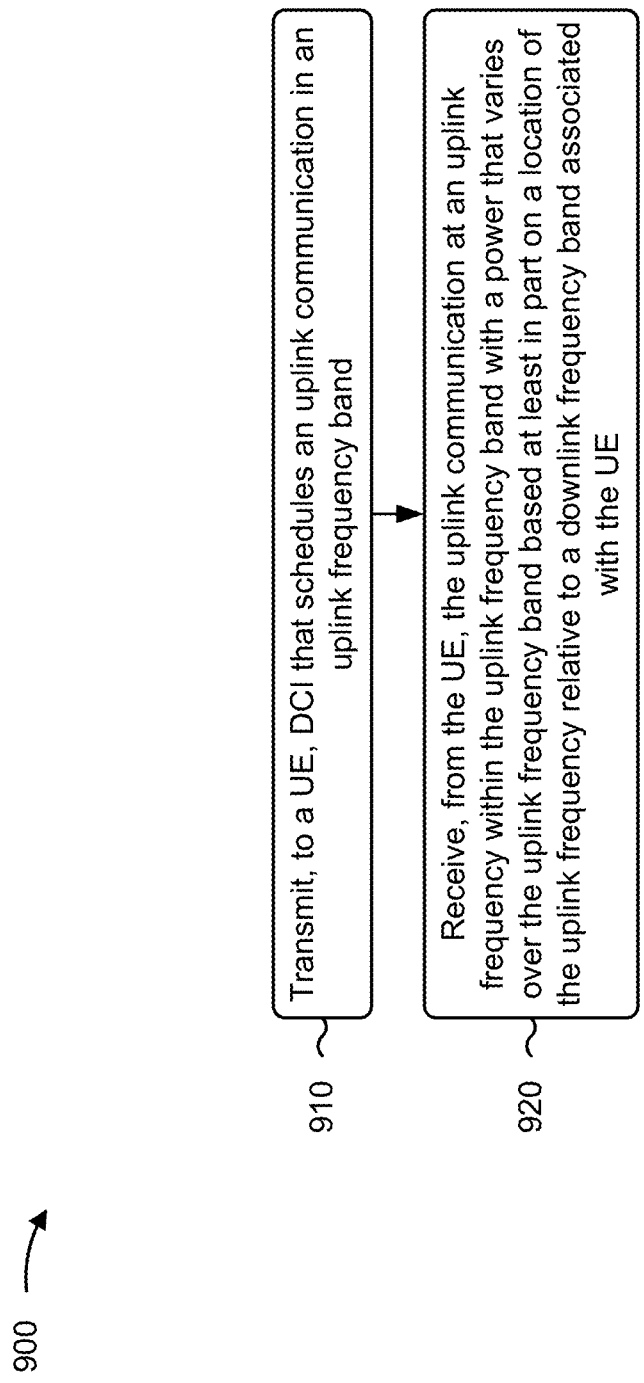

FIG. 9 is a diagram illustrating an example process 900 performed, for example, by a base station, in accordance with the present disclosure. Example process 900 is an example where the base station (e.g., base station 110 and/or the like) performs operations associated with uplink power control for FD communication.

As shown in FIG. 9, in some aspects, process 900 may include transmitting, to a UE, DCI that schedules an uplink communication in an uplink frequency band (block 910). For example, the base station (e.g., using controller/processor 240, transmit processor 220, TX MIMO processor 230, MOD 232, antenna 234, and/or the like) may transmit, to a UE, DCI that schedules an uplink communication in an uplink frequency band, as described above, for example, with reference to FIGS. 6A, 6B, and/or 7.

As further shown in FIG. 9, in some aspects, process 900 may include receiving, from the UE, the uplink communication at an uplink frequency within the uplink frequency band with a power that varies over the uplink frequency band based at least in part on a location of the uplink frequency relative to a downlink frequency band associated with the UE (block 920). For example, the base station (e.g., using antenna 234, DEMOD 232, MIMO detector 236, receive processor 238, controller/processor 240, and/or the like) may receive, from the UE, the uplink communication at an uplink frequency within the uplink frequency band with a power that varies over the uplink frequency band based at least in part on a location of the uplink frequency relative to a downlink frequency band associated with the UE, as described above, for example, with reference to FIGS. 6A, 6B, and/or 7.

Process 900 may include additional aspects, such as any single aspect or any combination of aspects described below and/or in connection with one or more other processes described elsewhere herein.

In a first aspect, the power varies over the uplink frequency band based at least in part on a frequency gap between the uplink frequency and the downlink frequency band.

In a second aspect, alone or in combination with the first aspect, process 900 includes transmitting a configuration for a plurality of sub-bands of the uplink frequency band.

In a third aspect, alone or in combination with one or more of the first and second aspects, a first sub-band and a second sub-band, of the plurality of sub-bands, are configured with different resource element sizes, different resource block sizes, or different resource block group sizes.

In a fourth aspect, alone or in combination with one or more of the first through third aspects, process 900 includes transmitting information that identifies at least one of: one or more sets of power offsets for a plurality of sub-bands of the uplink frequency band, or one or more sets of power scaling values for a plurality of symbols in which the uplink communication is scheduled.

In a fifth aspect, alone or in combination with one or more of the first through fourth aspects, process 900 includes transmitting an indication of a set of power offsets, of the one or more sets of power offsets, or a set of power scaling values, of the one or more sets of power scaling values, that is to be used for the uplink communication at the uplink frequency.

In a sixth aspect, alone or in combination with one or more of the first through fifth aspects, the indication is transmitted via the DCI, a MAC-CE, or RRC signaling.

In a seventh aspect, alone or in combination with one or more of the first through sixth aspects, process 900 includes determining a set of power offsets, of the one or more sets of power offsets, or a set of power scaling values, of the one or more sets of power scaling values, that is to be used for the uplink communication at the uplink frequency.

In an eighth aspect, alone or in combination with one or more of the first through seventh aspects, the set of power offsets or the set of power scaling values is determined based at least in part on at least one of a frequency gap between the uplink frequency and the downlink frequency band, or whether a downlink communication in the downlink frequency band is scheduled to overlap in time with the uplink communication.

In a ninth aspect, alone or in combination with one or more of the first through eighth aspects, the power varies over the uplink frequency band based at least in part on respective transmit powers for multiple sub-bands of the uplink frequency band, and the respective transmit powers are based at least in part on a set of power offsets.

In a tenth aspect, alone or in combination with one or more of the first through ninth aspects, the uplink communication is not received at the uplink frequency in a sub-band, of the multiple sub-bands, associated with a power offset, of the set of power offsets, that has a negative infinity value.

In an eleventh aspect, alone or in combination with one or more of the first through tenth aspects, process 900 includes transmitting information that identifies a plurality of filters for processing a baseband signal associated with the uplink communication.

In a twelfth aspect, alone or in combination with one or more of the first through eleventh aspects, process 900 includes transmitting an indication of a filter, of the plurality of filters, that is to be used for processing the baseband signal.

In a thirteenth aspect, alone or in combination with one or more of the first through twelfth aspects, the indication is transmitted via the DCI, a MAC-CE, or RRC signaling.

In a fourteenth aspect, alone or in combination with one or more of the first through thirteenth aspects, process 900 includes determining a filter, of the plurality of filters, that is to be used for processing the baseband signal.

In a fifteenth aspect, alone or in combination with one or more of the first through fourteenth aspects, the filter is determined based at least in part on at least one of a frequency gap between the uplink frequency and the downlink frequency band, or whether a downlink communication in the downlink frequency band is scheduled to overlap in time with the uplink communication.

In a sixteenth aspect, alone or in combination with one or more of the first through fifteenth aspects, the power varies over the uplink frequency band based at least in part on processing by the UE of a baseband signal, associated with the uplink communication, with a filter.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
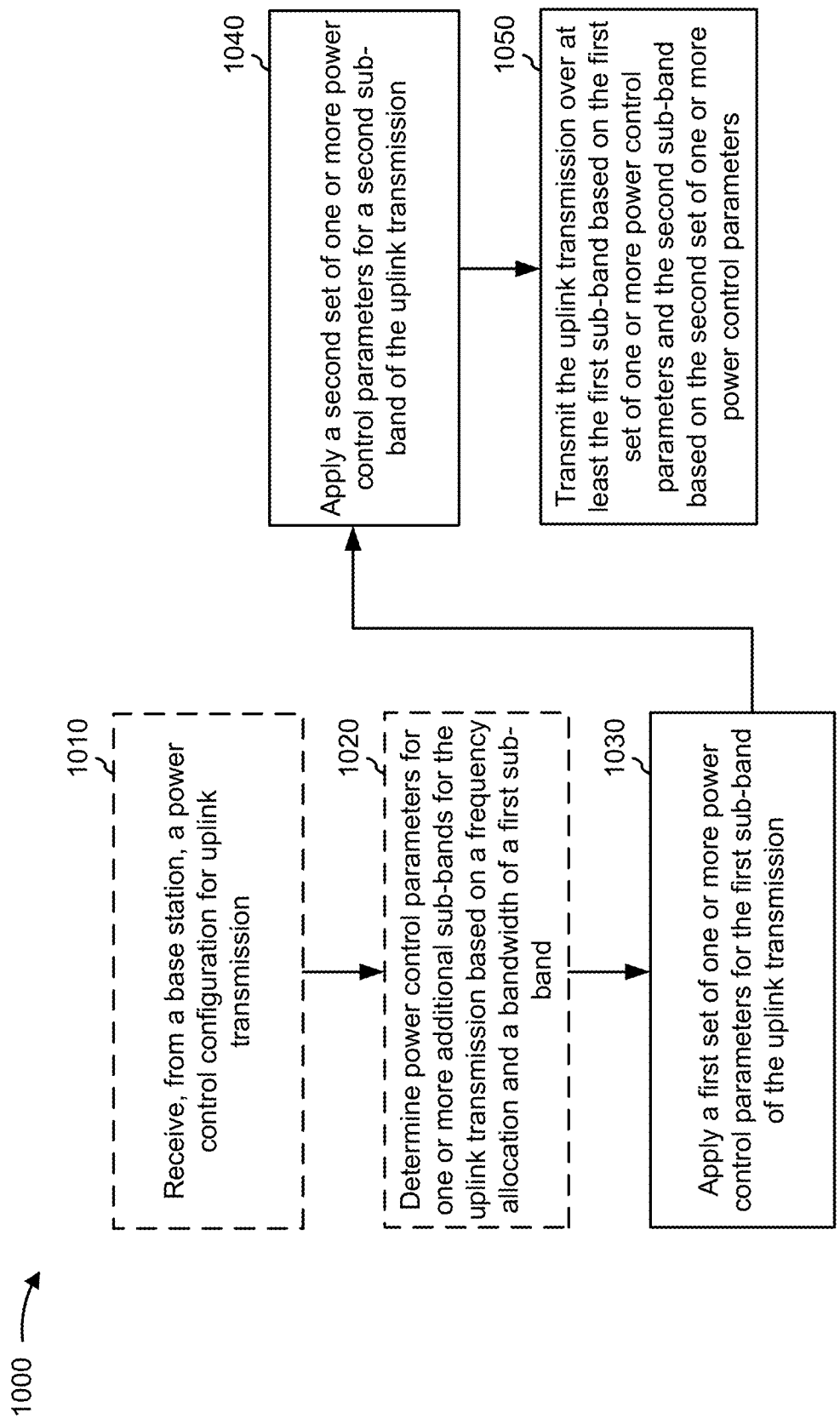

FIG. 10 is a diagram illustrating an example process 1000 performed, for example, by a UE, in accordance with the present disclosure. Optional aspects are illustrated with a dashed line. The process 1000 may allow a UE to be configured to apply different uplink power control parameters for different sub-bands.

In some aspects, for example at 1010, the UE (e.g., using antenna 252, DEMOD 254, MIMO detector 256, receive processor 258, controller/processor 280, and/or memory 282) may receive a power control configuration for uplink transmission, as described above, for example, with reference to FIGS. 6A, 6B, and/or 7. The UE may receive the power control configuration for the uplink transmission from a base station. The power control configuration may include at least one of sub-band information for power control or a power control parameter for at least one sub-band. In some aspects, the UE may receive a configuration for one or more power control parameters for a first sub-band of at least one sub-band of the uplink transmission. The power control configuration for the power control parameters for the uplink transmission is received by from the base station via RRC or DCI. In some aspects, the one or more power control parameters for the first sub-band may include at least one of a maximum power, a minimum power, a band separation with a downlink transmission, or a band corresponding to a half-duplex transmission.

In some aspects, for example at 1020, the UE (e.g., using controller/processor 280 and/or memory 282) may determine power control parameters, as described above, for example, with reference to FIGS. 6A, 6B, and/or 7. The UE may determine the power control parameters for one or more additional sub-bands for the uplink transmission. The UE may determine the power control parameters for one or more additional sub-bands for the uplink transmission based at least in part on a frequency allocation of the first sub-band, a bandwidth of the first sub-band, and/or a beam configuration.

At 1030, the UE (e.g., using controller/processor 280 and/or memory 282) may apply a first set of one or more power control parameters, as described above, for example, with reference to FIGS. 6A, 6B, and/or 7. The UE may apply the first set of the one or more power control parameters for a first sub-band of the uplink transmission.

At 1040, the UE (e.g., using controller/processor 280 and/or memory 282) may apply a second set of one or more power control parameters, as described above, for example, with reference to FIGS. 6A, 6B, and/or 7. The UE may apply the second set of one or more power control parameters for a second sub-band of the uplink transmission. In some aspects, the UE may apply the first set of one or more power control parameters for the first sub-band and the second set of one or more power control parameters for the second sub-band during a full duplex symbol and a half duplex symbol. In some aspects, the first power control parameter and the second power control parameter include a target power, a pathloss scaling factor, an offset value, or a downlink MCS term. In some aspects, at least one of the first set of one or more power control parameters or the second set of one or more power control parameters is determined by the UE. In some aspects, at least one of the first set of one or more power control parameters or the second set of one or more power control parameters is received from a network.

At 1050, the UE (e.g., using transmit processor 264, TX MIMO processor 266, MOD 254, antenna 252, controller/processor 280, and/or memory 282) may transmit the uplink transmission, as described above, for example, with reference to FIGS. 6A, 6B, and/or 7. The UE may transmit the uplink transmission over at least the first sub-band based at least in part on the first set of one or more power control parameters and the second sub-band based at least in part on the second set of one or more power control parameters. In some aspects, at least one of first set of one or more power control parameters or the second set of one or more power control parameters may be defined for an SRS resource indicator or for a URLLC or non-URLLC mode. The uplink transmission may comprise at least one of PUSCH, PUCCH, SRS, or RACH. At least one of the first set of one or more power control parameters or the second set of one or more power control parameters may be associated with at least one of the PUSCH, the PUCCH, the SRS, or the RACH for a full duplex operation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
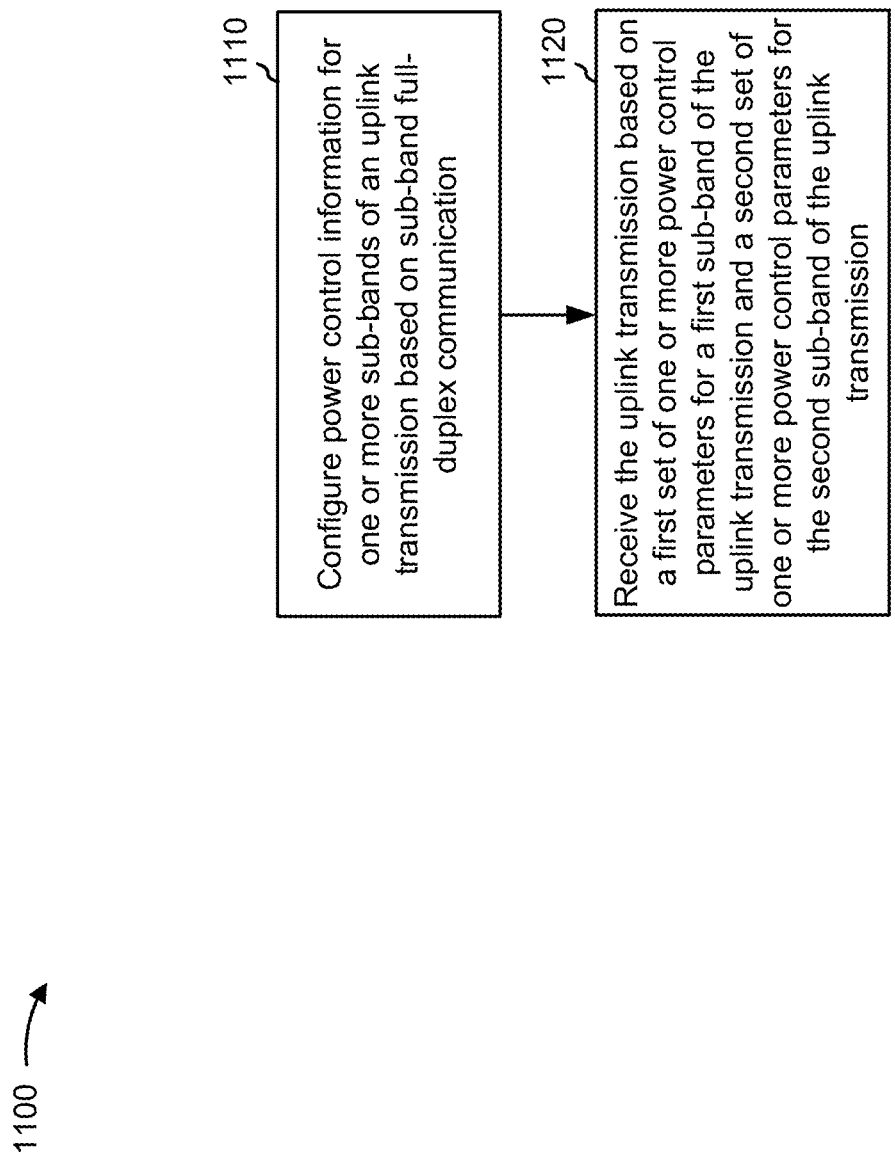

FIG. 11 is a diagram illustrating an example process 1100 performed, for example, by a base station, in accordance with the present disclosure. Optional aspects are illustrated with a dashed line. Process 1100 may allow a base station to configure a UE to apply different uplink power control parameters for different sub-bands.

At 1100, the base station (e.g., using transmit processor 220, TX MIMO processor 230, modulator 232, antenna 234, controller/processor 240, memory 242, and/or scheduler 246) may configure power control information for one or more sub-bands of an uplink transmission, as described above, for example, with reference to FIGS. 6A, 6B, and/or 7. The base station may configure the power control information for the one or more sub-bands of the uplink transmission based at least in part on sub-band full-duplex communication. The base station may transmit the power control information to a UE. In some aspects, the power control information includes at least one of a maximum power, a minimum power, a band separation with a downlink transmission, or a band corresponding to a half-duplex transmission.

At 1120, the base station (e.g., using antenna 234, DEMOD 232, MIMO detector 236, receive processor 238, controller/processor 240, and/or memory 242) may receive the uplink transmission from the UE. The base station may receive the uplink transmission based at least in part on a first set of one or more power control parameters for a first sub-band of the uplink transmission and a second set of one or more power control parameters for the second sub-band of the uplink transmission. In some aspects, the first set of one or more power control parameters or the second set of power control parameters may be defined for an SRS resource indicator or for URLLC or non-URLLC mode. In some aspects, the uplink transmission may comprise at least one of PUSCH, PUCCH, SRS, or RACH. At least one of the first set of one or more power control parameters or the second set of one or more power control parameters may be associated with at least one of the PUSCH, PUCCH, SRS, or RACH for a full duplex operation.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: receiving downlink control information (DCI) that schedules an uplink communication in an uplink frequency band; and transmitting, at an uplink frequency within the uplink frequency band, the uplink communication with a power that varies over the uplink frequency band based at least in part on a location of the uplink frequency relative to a downlink frequency band associated with the UE.

Aspect 2: The method of Aspect 1, wherein the power varies over the uplink frequency band based at least in part on a frequency gap between the uplink frequency and the downlink frequency band.

Aspect 3: The method of any of Aspects 1-2, further comprising: receiving a configuration for a plurality of sub-bands of the uplink frequency band.

Aspect 4: The method of Aspect 3, wherein a first sub-band and a second sub-band, of the plurality of sub-bands, are configured with different resource element sizes, different resource block sizes, or different resource block group sizes.

Aspect 5: The method of any of Aspects 1-4, further comprising: receiving information that identifies at least one of: one or more sets of power offsets for a plurality of sub-bands of the uplink frequency band, or one or more sets of power scaling values for a plurality of symbols in which the uplink communication is scheduled.

Aspect 6: The method of Aspect 5, further comprising: receiving an indication of a set of power offsets, of the one or more sets of power offsets, or a set of power scaling values, of the one or more sets of power scaling values, that is to be used for the uplink communication at the uplink frequency.

Aspect 7: The method of Aspect 6, wherein the indication is received via the DCI, a medium access control control element, or radio resource control signaling.

Aspect 8: The method of Aspect 5, further comprising: determining a set of power offsets, of the one or more sets of power offsets, or a set of power scaling values, of the one or more sets of power scaling values, that is to be used for the uplink communication at the uplink frequency.

Aspect 9: The method of Aspect 8, wherein the set of power offsets or the set of power scaling values is determined based at least in part on at least one of a frequency gap between the uplink frequency and the downlink frequency band, or whether a downlink communication in the downlink frequency band is scheduled to overlap in time with the uplink communication.

Aspect 10: The method of any of Aspects 1-9, further comprising: determining respective transmit powers for multiple sub-bands of the uplink frequency band based at least in part on a set of power offsets, wherein the power varies over the uplink frequency band based at least in part on the respective transmit powers.

Aspect 11: The method of Aspect 10, wherein the uplink communication is not transmitted at the uplink frequency in a sub-band, of the multiple sub-bands, associated with a power offset, of the set of power offsets, that has a negative infinity value.

Aspect 12: The method of any of Aspects 1-4, further comprising: receiving information that identifies a plurality of filters for processing a baseband signal associated with the uplink communication.

Aspect 13: The method of Aspect 12, further comprising: receiving an indication of a filter, of the plurality of filters, that is to be used for processing the baseband signal.

Aspect 14: The method of Aspect 13, wherein the indication is received via the DCI, a medium access control control element, or radio resource control signaling.

Aspect 15: The method of Aspect 12, further comprising: determining a filter, of the plurality of filters, that is to be used for processing the baseband signal.

Aspect 16: The method of Aspect 15, wherein the filter is determined based at least in part on at least one of a frequency gap between the uplink frequency and the downlink frequency band, or whether a downlink communication in the downlink frequency band is scheduled to overlap in time with the uplink communication.

Aspect 17: The method of any of Aspects 1-4 or 12-16, further comprising: processing a baseband signal associated with the uplink communication using a filter, wherein the power varies over the uplink frequency band based at least in part on processing the baseband signal using the filter.

Aspect 18: A method of wireless communication performed by a base station, comprising: transmitting, to a user equipment (UE), downlink control information (DCI) that schedules an uplink communication in an uplink frequency band; and receiving, from the UE, the uplink communication at an uplink frequency within the uplink frequency band with a power that varies over the uplink frequency band based at least in part on a location of the uplink frequency relative to a downlink frequency band associated with the UE.

Aspect 19: The method of Aspect 18, wherein the power varies over the uplink frequency band based at least in part on a frequency gap between the uplink frequency and the downlink frequency band.

Aspect 20: The method of any of Aspects 18-19, further comprising: transmitting a configuration for a plurality of sub-bands of the uplink frequency band.

Aspect 21: The method of Aspect 20, wherein a first sub-band and a second sub-band, of the plurality of sub-bands, are configured with different resource element sizes, different resource block sizes, or different resource block group sizes.

Aspect 22: The method of any of Aspects 18-21, further comprising: transmitting information that identifies at least one of: one or more sets of power offsets for a plurality of sub-bands of the uplink frequency band, or one or more sets of power scaling values for a plurality of symbols in which the uplink communication is scheduled.

Aspect 23: The method of Aspect 22, further comprising: transmitting an indication of a set of power offsets, of the one or more sets of power offsets, or a set of power scaling values, of the one or more sets of power scaling values, that is to be used for the uplink communication at the uplink frequency.

Aspect 24: The method of Aspect 23, wherein the indication is transmitted via the DCI, a medium access control control element, or radio resource control signaling.

Aspect 25: The method of Aspect 22, further comprising: determining a set of power offsets, of the one or more sets of power offsets, or a set of power scaling values, of the one or more sets of power scaling values, that is to be used for the uplink communication at the uplink frequency.

Aspect 26: The method of Aspect 25, wherein the set of power offsets or the set of power scaling values is determined based at least in part on at least one of a frequency gap between the uplink frequency and the downlink frequency band, or whether a downlink communication in the downlink frequency band is scheduled to overlap in time with the uplink communication.

Aspect 27: The method of any of Aspects 18-26, wherein the power varies over the uplink frequency band based at least in part on respective transmit powers for multiple sub-bands of the uplink frequency band, and wherein the respective transmit powers are based at least in part on a set of power offsets.

Aspect 28: The method of Aspect 27, wherein the uplink communication is not received at the uplink frequency in a sub-band, of the multiple sub-bands, associated with a power offset, of the set of power offsets, that has a negative infinity value.

Aspect 29: The method of any of Aspects 18-21, further comprising: transmitting information that identifies a plurality of filters for processing a baseband signal associated with the uplink communication.

Aspect 30: The method of Aspect 29, further comprising: transmitting an indication of a filter, of the plurality of filters, that is to be used for processing the baseband signal.

Aspect 31: The method of Aspect 30, wherein the indication is transmitted via the DCI, a medium access control control element, or radio resource control signaling.

Aspect 32: The method of Aspect 29, further comprising: determining a filter, of the plurality of filters, that is to be used for processing the baseband signal.

Aspect 33: The method of Aspect 32, wherein the filter is determined based at least in part on at least one of a frequency gap between the uplink frequency and the downlink frequency band, or whether a downlink communication in the downlink frequency band is scheduled to overlap in time with the uplink communication.

Aspect 34: The method of any of Aspects 18-21 or 29-33, wherein the power varies over the uplink frequency band based at least in part on processing by the UE of a baseband signal, associated with the uplink communication, with a filter.

Aspect 35: An apparatus for wireless communication at a device, comprising a processor; memory coupled with the processor; and instructions stored in the memory and executable by the processor to cause the apparatus to perform the method of one or more Aspects of Aspects 1-17.

Aspect 36: A device for wireless communication, comprising a memory and one or more processors coupled to the memory, the memory and the one or more processors configured to perform the method of one or more Aspects of Aspects 1-17.

Aspect 37: An apparatus for wireless communication, comprising at least one means for performing the method of one or more Aspects of Aspects 1-17.

Aspect 38: A non-transitory computer-readable medium storing code for wireless communication, the code comprising instructions executable by a processor to perform the method of one or more Aspects of Aspects 1-17.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 40: An apparatus for wireless communication at a device, comprising a processor; memory coupled with the processor; and instructions stored in the memory and executable by the processor to cause the apparatus to perform the method of one or more Aspects of Aspects 18-34.

Aspect 41: A device for wireless communication, comprising a memory and one or more processors coupled to the memory, the memory and the one or more processors configured to perform the method of one or more Aspects of Aspects 18-34.

Aspect 42: An apparatus for wireless communication, comprising at least one means for performing the method of one or more Aspects of Aspects 18-34.

Aspect 43: A non-transitory computer-readable medium storing code for wireless communication, the code comprising instructions executable by a processor to perform the method of one or more Aspects of Aspects 18-34.

Aspect 44: A non-transitory computer-readable medium storing a set of instructions for wireless communication, the set of instructions comprising one or more instructions that, when executed by one or more processors of a device, cause the device to perform the method of one or more Aspects of Aspects 18-34.

Aspect 45: A method of wireless communication of a UE comprising applying a first set of one or more power control parameters for a first sub-band of an uplink transmission; applying a second set of one or more power control parameters for a second sub-band of the uplink transmission; and transmitting the uplink transmission over at least the first sub-band based on the first set of one or more power control parameters and the second sub-band based on the second set of one or more power control parameters.

Aspect 46: The method of Aspect 45 further includes receiving, from a base station, a power control configuration for the uplink transmission, wherein the power control configuration includes at least one of sub-band information for power control or a power control parameter for at least one sub-band.

Aspect 47: The method of Aspect 45 or 46 further includes that the power control configuration for power control parameters for the uplink transmission is received by from the base station via RRC or DCI.

Aspect 48: The method of any of Aspects 45-47 further includes receiving, from a base station, a configuration for one or more power control parameters for the first sub-band of the uplink transmission; and determining power control parameters for one or more additional sub-bands for the uplink transmission based on a frequency allocation and a bandwidth of the first sub-band.

Aspect 49: The method of any of Aspects 45-48 further includes that the one or more power control parameters for the first sub-band includes at least one of a maximum power, a minimum power, a band separation with a downlink transmission, or a band corresponding to a half-duplex transmission.

Aspect 50: The method of any of Aspects 45-49 further includes that the first set of one or more power control parameters and the second set of one or more power control parameters are defined for an SRS resource indicator or for an URLLC or non-URLLC mode.

Aspect 51: The method of any of Aspects 45-50 further includes that the uplink transmission comprises at least one of a PUSCH, a PUCCH, SRS, or a RACH, wherein the first set of one or more power control parameters and the second set of one or more power control parameters are associated with at least one of the PUSCH, the PUCCH, the SRS, or the RACH for a full duplex operation.

Aspect 52: The method of any of Aspects 45-51 further includes that the UE applies the first set of one or more power control parameters for the first sub-band and the second set of one or more power control parameters for the second sub-band during a full duplex symbol and a half duplex symbol.

Aspect 53: The method of any of Aspects 45-52 further includes that a first power control parameter and a second power control parameter include a target power, a pathloss scaling factor, an offset value, or a downlink MCS term.

Aspect 54: The method of any of Aspects 45-53 further includes that at least one of the first set of one or more power control parameters or the second set of one or more power control parameters is determined by the UE.

Aspect 55: The method of any of Aspects 45-54 further includes that at least one of the first set of one or more power control parameters or the second set of one or more power control parameters is received from a network.

Aspect 56: A device including one or more processors and one or more memories in electronic communication with the one or more processors storing instructions executable by the one or more processors to cause the system or apparatus to implement a method as in any of Aspects 45-55.

Aspect 57: A system or apparatus including means for implementing a method or realizing an apparatus as in any of Aspects 45-55.

Aspect 58: A non-transitory computer readable medium storing instructions executable by one or more processors to cause the one or more processors to implement a method as in any of Aspects 45-55.

Aspect 59: A method of wireless communication at a base station comprising configuring power control information for one or more sub-bands of an uplink transmission based on sub-band full-duplex communication; and receiving the uplink transmission based on a first set of one or more power control parameters for a first sub-band of the uplink transmission and a second set of one or more power control parameters for a second sub-band of the uplink transmission.

Aspect 60: The method of Aspect 59 further includes that the power control information includes at least one of a maximum power, a minimum power, a band separation with a downlink transmission, or a band corresponding to a half-duplex transmission.

Aspect 61: The method of Aspect 59 or 60 further includes that the first set of one or more power control parameters and the second set of one or more power control parameters are defined for an SRS resource indicator or for an ultra-reliable low-latency communication (URLLC) or non-URLLC mode.

Aspect 62: The method of any of Aspects 59-61 further includes that the uplink transmission comprises at least one of a PUSCH, a PUCCH, SRS, or a RACH, wherein the first set of one or more power control parameters and the second set of one or more power control parameters are associated with at least one of the PUSCH, the PUCCH, the SRS, or the RACH for a full duplex operation.

Aspect 63: A device including one or more processors and one or more memories in electronic communication with the one or more processors storing instructions executable by the one or more processors to cause the system or apparatus to implement a method as in any of Aspects 59-62.

Aspect 64: A system or apparatus including means for implementing a method or realizing an apparatus as in any of Aspects 59-62.

Aspect 65: A non-transitory computer readable medium storing instructions executable by one or more processors to cause the one or more processors to implement a method as in any of Aspects 59-62.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving downlink control information (DCI) that schedules an uplink communication in an uplink frequency band; and
    transmitting, within the uplink frequency band, the uplink communication over a first sub-band with a first power that is based at least in part on a first frequency location of the first sub-band relative to a downlink frequency band associated with the UE and over a second sub-band with a second power that is based at least in part on a second frequency location of the second sub-band relative to the downlink frequency band associated with the UE.

2. The method of claim 1, further comprising:
    applying a first set of one or more power control parameters for the first sub-band of the uplink communication; and
    applying a second set of one or more power control parameters for the second sub-band of the uplink communication,
        wherein the uplink communication is transmitted over at least the first sub-band based at least in part on the first set of one or more power control parameters and the second sub-band based at least in part on the second set of one or more power control parameters.

3. The method of claim 2, further comprising:
    receiving a configuration for one or more power control parameters for the first sub-band of the uplink communication; and
    determining power control parameters for one or more additional sub-bands for the uplink communication based at least in part on at least two of a frequency allocation of the first sub-band, a bandwidth of the first sub-band, or a beam configuration,
        wherein the one or more power control parameters for the first sub-band includes at least one of a maximum power, a minimum power, a band separation with a downlink transmission, or a band corresponding to a half-duplex transmission.

4. The method of claim 2, wherein a first power control parameter and a second power control parameter include a target power, a pathloss scaling factor, an offset value, or a downlink modulation and coding scheme (MCS) term.

5. The method of claim 1, wherein:
the first power is based at least in part on a first frequency gap between the first sub-band and the downlink frequency band, and
the second power is based at least in part on a second frequency gap between the second sub-band and the downlink frequency band.

6. The method of claim 1, further comprising:
receiving information that identifies at least one of:
one or more sets of power offsets for a plurality of sub-bands of the uplink frequency band, the plurality of sub-bands including the first sub-band and the second-sub-band; or
one or more sets of power scaling values for a plurality of symbols in which the uplink communication is scheduled.

7. The method of claim 6, further comprising:
receiving an indication of a set of power offsets, of the one or more sets of power offsets, or a set of power scaling values, of the one or more sets of power scaling values, that is to be used for the uplink communication within the uplink frequency band.

8. The method of claim 6, further comprising:
determining a set of power offsets, of the one or more sets of power offsets, or a set of power scaling values, of the one or more sets of power scaling values, that is to be used for the uplink communication within the uplink frequency band based at least in part on at least one of a frequency gap between the uplink frequency band and the downlink frequency band, or whether a downlink communication in the downlink frequency band is scheduled to overlap in time with the uplink communication.

9. The method of claim 1, further comprising:
determining respective transmit powers for multiple sub-bands of the uplink frequency band based at least in part on a set of power offsets,
wherein the first power and the second power are based at least in part on the respective transmit powers.

10. The method of claim 1, further comprising:
receiving information that identifies a plurality of filters for processing a baseband signal associated with the uplink communication; and
receiving an indication of a filter, of the plurality of filters, that is to be used for processing the baseband signal.

11. The method of claim 10, further comprising:
determining a filter, of the plurality of filters, that is to be used for processing the baseband signal based at least in part on at least one of a frequency gap between the uplink frequency band and the downlink frequency band, or whether a downlink communication in the downlink frequency band is scheduled to overlap in time with the uplink communication.

12. The method of claim 1, further comprising:
processing a baseband signal associated with the uplink communication using a filter,
wherein the first power or the second power is based at least in part on processing the baseband signal using the filter.

13. A method of wireless communication performed by a base station, comprising:
transmitting, to a user equipment (UE), downlink control information (DCI) that schedules an uplink communication in an uplink frequency band; and
receiving, from the UE, the uplink communication within the uplink frequency band over a first sub-band with a first power that is based at least in part on a first frequency location of the first sub-band relative to a downlink frequency band associated with the UE and over a second sub-band with a second power that is based at least in part on a second frequency location of the second sub-band relative to the downlink frequency band associated with the UE.

14. The method of claim 13, further comprising:
transmitting a configuration for one or more power control parameters for at least the first sub-band of the uplink communication,
wherein the uplink communication is received based at least in part on a first set of one or more power control parameters for the first sub-band of the uplink communication and a second set of one or more power control parameters for a second sub-band of the uplink communication.

15. The method of claim 13, wherein:
the first power is based at least in part on a first frequency gap between the first sub-band and the downlink frequency band, and
the second power is based at least in part on a second frequency gap between the second sub-band and the downlink frequency band.

16. The method of claim 13, further comprising:
transmitting information that identifies at least one of:
one or more sets of power offsets for a plurality of sub-bands of the uplink frequency band, the plurality of sub-bands including the first sub-band and the second-sub-band; or
one or more sets of power scaling values for a plurality of symbols in which the uplink communication is scheduled.

17. The method of claim 16, further comprising:
transmitting an indication of a set of power offsets, of the one or more sets of power offsets, or a set of power scaling values, of the one or more sets of power scaling values, that is to be used for the uplink communication within the uplink frequency band.

18. The method of claim 16, further comprising:
determining a set of power offsets, of the one or more sets of power offsets, or a set of power scaling values, of the one or more sets of power scaling values, that is to be used for the uplink communication within the uplink frequency band based at least in part on at least one of a frequency gap between the uplink frequency band and the downlink frequency band, or whether a downlink communication in the downlink frequency band is scheduled to overlap in time with the uplink communication.

19. The method of claim 13, wherein the first power and the second power are based at least in part on respective transmit powers for multiple sub-bands of the uplink frequency band, and
wherein the respective transmit powers are based at least in part on a set of power offsets.

20. A user equipment (UE) for wireless communication, comprising:
a memory; and
one or more processors coupled to the memory, the one or more processors configured to:
receive downlink control information (DCI) that schedules an uplink communication in an uplink frequency band; and
transmit, within the uplink frequency band, the uplink communication over a first sub-band with a first power that is based at least in part on a first frequency location of the first sub-band relative to a downlink frequency band associated with the UE and over a second sub-band with a second power that is based at least in part on a second frequency location of the second sub-band relative to the downlink frequency band associated with the UE.

21. The UE of claim 20, wherein the one or more processors are further configured to:
apply a first set of one or more power control parameters for the first sub-band of the uplink communication; and
apply a second set of one or more power control parameters for the second sub-band of the uplink communication,
wherein the uplink communication is transmitted over at least the first sub-band based at least in part on the first set of one or more power control parameters and the second sub-band based at least in part on the second set of one or more power control parameters.

22. The UE of claim 21, wherein the one or more processors are further configured to:
receive a configuration for one or more power control parameters for the first sub-band of the uplink communication; and
determine power control parameters for one or more additional sub-bands for the uplink communication based at least in part on at least two of a frequency allocation of the first sub-band, a bandwidth of the first sub-band, or a beam configuration,
wherein the one or more power control parameters for the first sub-band includes at least one of a maximum power, a minimum power, a band separation with a downlink transmission, or a band corresponding to a half-duplex transmission.

23. The UE of claim 20, wherein the one or more processors are further configured to:
receive information that identifies at least one of:
one or more sets of power offsets for a plurality of sub-bands of the uplink frequency band, the plurality of sub-bands including the first sub-band and the second-sub-band; or
one or more sets of power scaling values for a plurality of symbols in which the uplink communication is scheduled.

24. The UE of claim 20, wherein the one or more processors are further configured to:
determine respective transmit powers for multiple sub-bands of the uplink frequency band based at least in part on a set of power offsets,
wherein the first power and the second power are based at least in part on the respective transmit powers.

25. The UE of claim 20, wherein the one or more processors are further configured to:
receive information that identifies a plurality of filters for processing a baseband signal associated with the uplink communication.

26. The UE of claim 20, wherein the one or more processors are further configured to:
process a baseband signal associated with the uplink communication using a filter,
wherein the first power or the second power is based at least in part on processing the baseband signal using the filter.

27. A base station for wireless communication, comprising:
a memory; and
one or more processors coupled to the memory, the one or more processors configured to:
transmit, to a user equipment (UE), downlink control information (DCI) that schedules an uplink communication in an uplink frequency band; and
receive, from the UE, the uplink communication within the uplink frequency band over a first sub-band with a first power that is based at least in part on a first frequency location of the first sub-band relative to a downlink frequency band associated with the UE and over a second sub-band with a second power that is based at least in part on a second frequency location of the second sub-band relative to the downlink frequency band associated with the UE.

28. The base station of claim 27, wherein the one or more processors are further configured to:
transmit a configuration for one or more power control parameters for at least the first sub-band of the uplink communication,
wherein the uplink communication is received based at least in part on a first set of one or more power control parameters for the first sub-band of the uplink communication and a second set of one or more power control parameters for a second sub-band of the uplink communication.

29. The base station of claim 27, wherein the one or more processors are further configured to:
transmit information that identifies at least one of:
one or more sets of power offsets for a plurality of sub-bands of the uplink frequency band, the plurality of sub-bands including the first sub-band and the second-sub-band; or
one or more sets of power scaling values for a plurality of symbols in which the uplink communication is scheduled.

30. The base station of claim 29, wherein the one or more processors are further configured to:
transmit an indication of a set of power offsets, of the one or more sets of power offsets, or a set of power scaling values, of the one or more sets of power scaling values, that is to be used for the uplink communication within the uplink frequency band.

* * * * *